United States Patent
Kinoshita et al.

(10) Patent No.: US 9,346,358 B2
(45) Date of Patent: May 24, 2016

(54) VEHICLE CONTROL APPARATUS

(71) Applicant: FUJITSU TEN LIMITED, Kobe-shi, Hyogo (JP)

(72) Inventors: Tomohiro Kinoshita, Kobe (JP); Soutaro Kaneko, Kobe (JP); Jun Fujihara, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 0 days.

(21) Appl. No.: 14/661,601

(22) Filed: Mar. 18, 2015

(65) Prior Publication Data

US 2015/0274016 A1 Oct. 1, 2015

(30) Foreign Application Priority Data

Mar. 31, 2014 (JP) ................. 2014-071216

(51) Int. Cl.
| | |
|---|---|
| *B60K 35/00* | (2006.01) |
| *G06F 3/0484* | (2013.01) |
| *G06F 3/0481* | (2013.01) |
| *B60K 37/06* | (2006.01) |
| *B60R 1/00* | (2006.01) |
| *B60S 1/08* | (2006.01) |

(52) U.S. Cl.
CPC ............. *B60K 35/00* (2013.01); *B60K 37/06* (2013.01); *B60R 1/00* (2013.01); *G06F 3/04815* (2013.01); *G06F 3/04842* (2013.01); *B60K 2350/106* (2013.01); *B60K 2350/1008* (2013.01); *B60K 2350/1028* (2013.01); *B60K 2350/1032* (2013.01); *B60R 2300/602* (2013.01); *B60R 2300/607* (2013.01); *B60S 1/08* (2013.01)

(58) Field of Classification Search
CPC ........... B60K 35/00; B60K 2350/1004; B60K 2350/1008; B60K 2350/1024; B60K 2350/1028; G06F 3/0488; G06F 3/04842; G06F 3/04815
See application file for complete search history.

(56) References Cited

U.S. PATENT DOCUMENTS

| | | | | |
|---|---|---|---|---|
| 8,239,087 B2* | 8/2012 | Dybalski | ............... | B60K 35/00 345/156 |
| 8,332,093 B2* | 12/2012 | Yamasaki | ............... | G06F 3/017 340/425.5 |

(Continued)

FOREIGN PATENT DOCUMENTS

| | | | | |
|---|---|---|---|---|
| FR | 2936479 A1 * | 4/2010 | ............. | B60K 35/00 |
| JP | 2008202239 A | 9/2008 | | |
| JP | 2012011849 A | 1/2012 | | |

OTHER PUBLICATIONS

EPO machine translation of FR 2936479 (original FR document published Apr. 2, 2010).*

(Continued)

*Primary Examiner* — Behrang Badii
*Assistant Examiner* — David Testardi
(74) *Attorney, Agent, or Firm* — Oliff PLC

(57) ABSTRACT

In a vehicle control apparatus, a display device displays a vehicle image showing a vehicle shape viewed from a virtual view point, and a user interface accepts a user's operation. When the user interface accepts the user's operation that issues an instruction for changing the vehicle image, a display control unit causes the display device to display the vehicle image after the changing of the virtual view point. Simultaneously, the display control unit causes the display device to display command buttons corresponding to portions of the vehicle shown by the vehicle image after the changing of the virtual view point.

12 Claims, 20 Drawing Sheets

(56) References Cited

U.S. PATENT DOCUMENTS

| | | | |
|---|---|---|---|
| 9,073,482 B2 * | 7/2015 | Yamamoto | B60R 1/00 |
| 2012/0140073 A1 * | 6/2012 | Ohta | B60R 25/1012 348/148 |
| 2013/0170710 A1 * | 7/2013 | Kuoch | G06K 9/00832 382/104 |
| 2014/0095030 A1 * | 4/2014 | Boblett | B60G 17/015 701/49 |
| 2014/0095031 A1 * | 4/2014 | Boblett | B60G 17/015 701/49 |
| 2014/0132527 A1 * | 5/2014 | Wu | G06F 3/04883 345/173 |
| 2014/0136054 A1 * | 5/2014 | Hsia | B60R 1/00 701/42 |
| 2014/0258928 A1 * | 9/2014 | Brush | G06F 3/0482 715/810 |
| 2015/0278999 A1 * | 10/2015 | Summers | G06Q 10/10 345/419 |

OTHER PUBLICATIONS

JPO machine translation of JP 2008-202239 (original JP document published Sep. 4, 2008).*

* cited by examiner

VEHICLE CONTROL APPARATUS

BACKGROUND OF THE INVENTION

1. Field of the Invention

The present invention relates to a technology for controlling vehicles.

2. Description of the Related Art

In vehicles of recent years, various portions of a vehicle are driven by being electronically controlled. In general, in the vicinity of a user's (mainly a driver's) seat of the vehicle, physical switches for issuing instructions for driving portions to be electronically controlled as described above are provided.

The user of the vehicle needs to know which switch corresponds to which portion. Therefore, in the case where the user is not get used to the vehicle, the user cannot grasp correspondence relations between portions of the vehicle and the switches, and hence there may be a case where an instruction for driving a desired portion cannot be issued.

In order to avoid such a circumstance, a vehicle control apparatus which allows the user to perform a touch operation with respect to command buttons displayed on a screen, so that an instruction for driving a portion of the vehicle can be issued centrally is proposed. In this vehicle control apparatus, a vehicle image showing the vehicle shape is displayed, and command buttons relating to portions of the vehicle in the vicinity of the corresponding portions of the vehicle image are displayed. For example, a command button for issuing an instruction for locking a door is shown in the vicinity of the corresponding door of the vehicle image. With this display method, the user can grasp the correspondence relation between the portions of the vehicle and the command buttons.

In this vehicle control apparatus, various types of parts such as the doors, windows, and side mirrors are required to be objects of control in the future. However, when the number of types of the objects to be controlled is increased, the number of command buttons that the vehicle control apparatus is to display is also increased. If the number of command buttons to be displayed in one screen increases, the user can hardly grasp the correspondence relation between the portions of the vehicle and the command buttons, and hence the command button can hardly be identified. Consequently, probability of occurrence of operation error of the user is increased.

SUMMARY OF THE INVENTION

According to one aspect of the present invention, a vehicle control apparatus that controls a vehicle includes: a display device that displays a vehicle image showing a vehicle shape viewed from a virtual view point; a user interface that accepts a user's operation to change the vehicle image; a display controller that causes the display device to display the vehicle image after a change of the vehicle image and that causes the display device to display a button corresponding to a portion of the vehicle shown by the vehicle image after the change, when the user interface accepts the user's operation that issues an instruction for changing the vehicle image; and a vehicle controller that controls a portion of the vehicle corresponding to the button when the user interface accepts the user's operation aiming at the button.

The vehicle image after the change is displayed, and the button corresponding to the portion of the vehicle shown by the vehicle image after the change is displayed on the display device. Therefore, only a required button is displayed, and hence an operation error of a user is prevented.

According to another aspect of the invention, in a case where the user interface accepts the user's operation that issues an instruction for enlarging the vehicle image, the display controller causes the display device to display the vehicle image after an enlargement, and also causes the display device to display a button corresponding to a portion of the vehicle shown by the vehicle image after the enlargement.

The vehicle image after the enlargement is displayed, and the button corresponding to the portion of the vehicle shown by the vehicle image after the enlargement is displayed on the display device. Therefore, the number of the buttons to be displayed on the display device may be reduced, and hence the operation error of the user is prevented.

According to another aspect of the invention, in a case where the user interface accepts the user's operation that issues an instruction for changing the virtual view point, the display controller causes the display device to display the vehicle image viewed from the virtual view point after the changing of the virtual view point, and also causes the display device to display the button corresponding to a portion of the vehicle shown by the vehicle image viewed from the virtual view point after the changing of the virtual view point.

The vehicle image viewed from the virtual view point after the changing of the virtual view point is displayed, and the button corresponding to the portion of the vehicle shown by the vehicle image viewed from the virtual view point after the changing of the virtual view point is displayed on the display device. Therefore, the number of the buttons to be displayed on the display device may be reduced, and hence the operation error of the user is prevented.

Accordingly, it is an object of the present invention is to prevent an operation error of a user.

These and other objects, features, aspects and advantages of the present invention will become more apparent from the following detailed description of the present invention when taken in conjunction with the accompanying drawings.

DESCRIPTION OF THE EMBODIMENTS

Hereinafter, embodiments of the present invention will be described with reference to the drawings.

<1. First Embodiment>
<1-1. Configuration>

Figure 1:
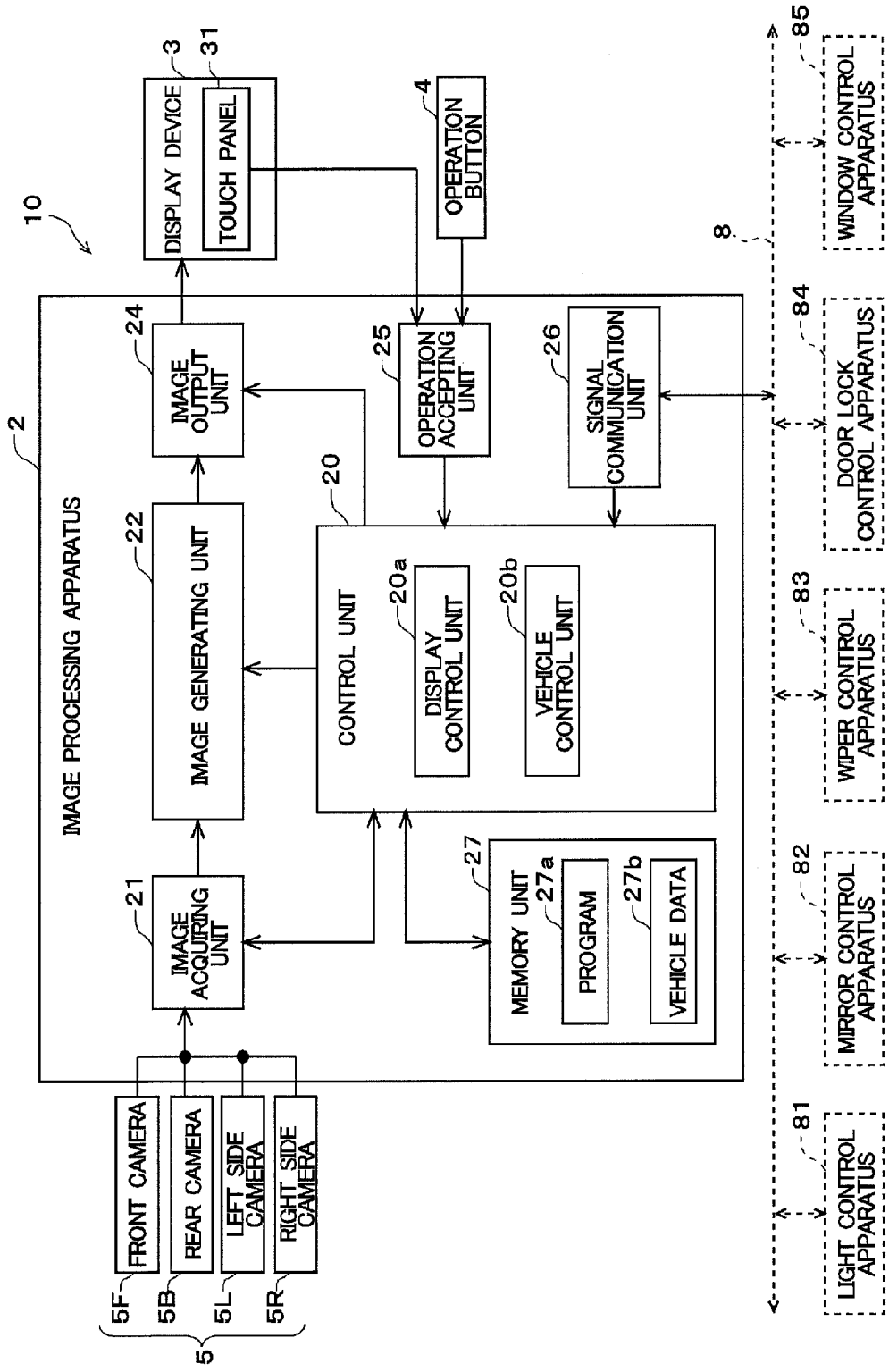
FIG. 1 is a drawing illustrating a configuration of a vehicle control apparatus of a first embodiment.

FIG. 1 is a drawing illustrating a configuration of a vehicle control apparatus 10 of a first embodiment. The vehicle control apparatus 10 is used in a vehicle (an automotive vehicle in this embodiment), and has a function to control and drive various portions of the vehicle in response to a user's operation. A user of the vehicle (typically, a driver) is allowed to issue instructions centrally to drive the various portions of the vehicle such as lock/unlock of doors, open/close of windows, retraction/deployment of side mirrors to the vehicle control apparatus 10.

The vehicle control apparatus 10 also has a function to display a synthetic image showing a condition of a periphery of the vehicle viewed from a virtual view point outside the vehicle. The synthetic image includes a vehicle image showing the vehicle shape viewed from the virtual view point outside the vehicle. The user is allowed to perform the user's operation, which corresponds to an instruction for driving a portion of the vehicle while confirming the condition of the periphery of the vehicle (image of an object) and the vehicle shape (vehicle image).

As illustrated, the vehicle control apparatus 10 mainly includes a plurality of cameras 5, an image processing apparatus 2, a display device 3, and an operation button 4. The plurality of cameras 5 shoot images of the periphery of the vehicle to acquire shot images, and input acquired shot images to the image processing apparatus 2. The image processing apparatus 2 is configured to generate a synthetic image showing the periphery of the vehicle viewed from a virtual view point by using a plurality of the shot images. The display device 3 is configured to display the synthetic image generated by the image processing apparatus 2. The operation button 4 is an operating member operated by the user.

The plurality of cameras 5 each includes a lens and an image pickup element, and are configured to electronically acquire the shot image showing the periphery of the vehicle. The plurality of cameras 5 include a front camera 5F, a rear camera 5B, a left side camera 5L, and a right side camera 5R. These four cameras 5F, 5B, 5L, 5R are arranged at positions on a vehicle 9 different from each other, and shoot images of the periphery of the vehicle 9 in different directions.

Figure 2:
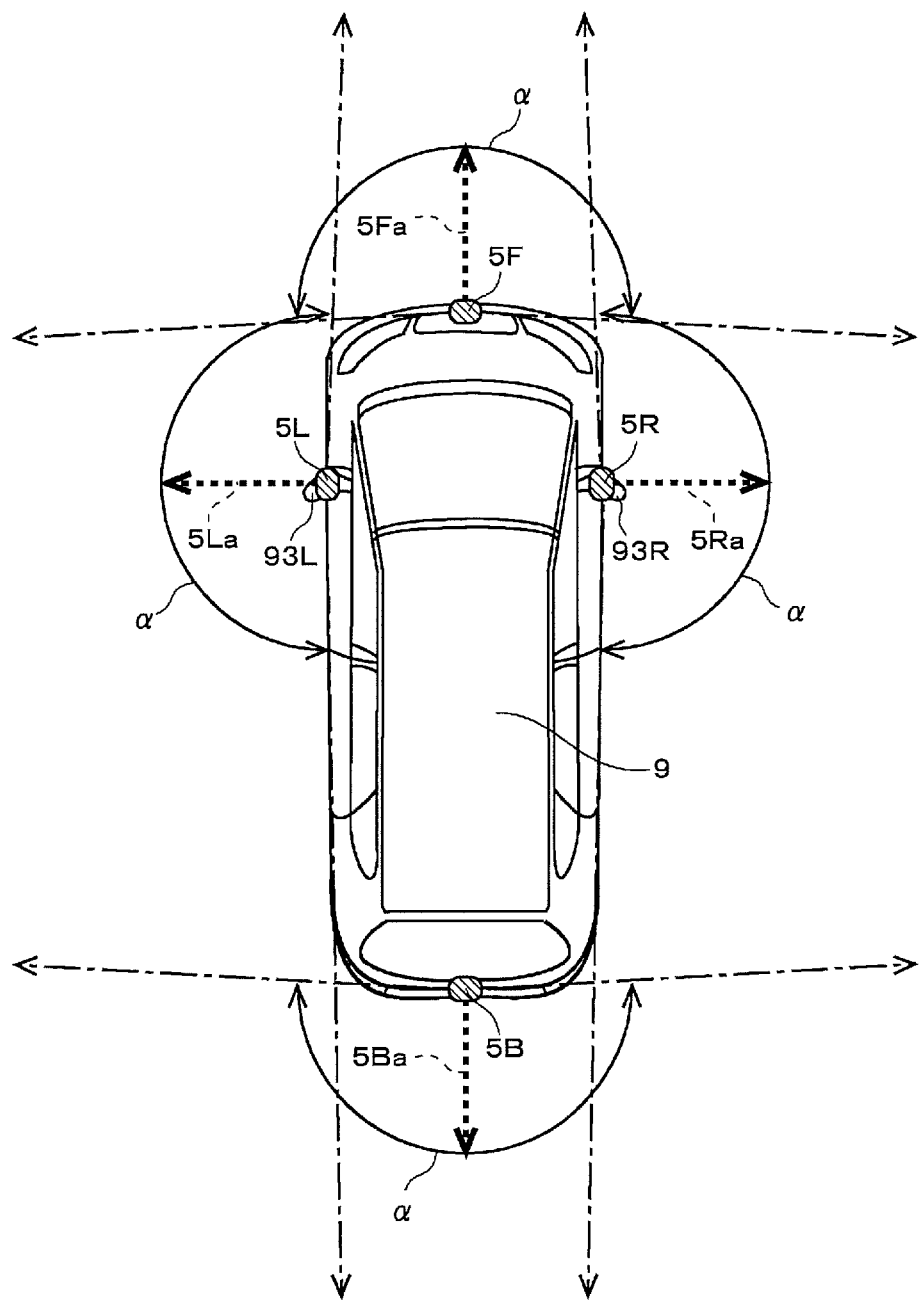
FIG. 2 is a drawing illustrating directions in which four cameras shoot respectively.

FIG. 2 is a drawing illustrating directions in which four cameras 5F, 5B, 5L, 5R shoot respectively. The front camera 5F is provided at a front end of the vehicle 9, and an optical axis 5Fa thereof is directed in the direction of advance of the vehicle 9. The rear camera 5B is provided at a rear end of the vehicle 9, and an optical axis 5Ba thereof is directed in the direction opposite to the direction of advance of the vehicle 9. The left side camera 5L is provided on a side mirror 93L on the left side and an optical axis 5La thereof is directed leftward of the vehicle 9. The right side camera 5R is provided on a side mirror 93R on the right side and an optical axis 5Ra thereof is directed rightward of the vehicle 9.

Wide lenses such as fish-eye lenses are employed as lenses of the cameras 5F, 5B, 5L, 5R, and the respective cameras 5F, 5B, 5L, 5R have a field angle α of 180 degrees or larger. Therefore, by using the four cameras 5F, 5B, 5L, 5R, entire periphery of the vehicle 9 can be shot.

Returning back to FIG. 1, the display device 3 is provided with a thin profile display panel such as liquid crystal, and is configured to display various items of information or images. The display device 3 is arranged in an instrument panel of the vehicle 9 so that the user can view a screen of the display device 3. The display device 3 may either be arranged in the same housing as the image processing apparatus 2 and integrated with the image processing apparatus 2, or be a separate apparatus.

The display device 3 is provided with a touch panel 31 configured to detect the user's touch operation with respect to the screen thereof. The touch panel 31 has an electrostatic capacitance system, and is capable of detecting multiple touch operations such as a flick operation and a pinch operation.

The operation button 4 is a physical button to be operated by the user by a pressing action. The operation button 4 is provided on, for example, a steering wheel of the vehicle 9, and may be operated mainly by the driver.

The user is capable of issuing various instructions to the vehicle control apparatus 10 by operating the touch panel 31 and the operation button 4. When the user performs an operation with respect to either the touch panel 31 or the operation button 4, an operation signal indicating the content of the user's operation is input to the image processing apparatus 2.

The image processing apparatus 2 is an electronic apparatus capable of performing various types of image processing, and functions as a main body portion of the vehicle control apparatus 10. The image processing apparatus 2 includes an image acquiring unit 21, an image generating unit 22, and an image output unit 24.

The image acquiring unit 21 acquires the shot images obtained respectively by the four cameras 5F, 5B, 5L, 5R. The image acquiring unit 21 includes an image processing function such as a function to convert an analogue shot image into a digital shot image. The image acquiring unit 21 performs predetermined image processing on the acquired shot images, and input the shot images after processing into the image generating unit 22. In the case where the four cameras 5F, 5B, 5L, 5R acquire digital shot images, the image acquiring unit 21 does not need to have a function to convert the analogue shot image into the digital shot image.

The image generating unit 22 is a hardware circuit configured to perform the image processing for generating the synthetic image. The image generating unit 22 synthesizes the four shot images acquired by the four cameras 5, and generates the synthetic image showing the periphery of the vehicle 9 viewed from the virtual view point. Detailed description about a method that the image generating unit 22 generates the synthetic images will be given later.

The image output unit 24 outputs the synthetic image generated by the image generating unit 22 to the display device 3. Accordingly, the synthetic image showing the periphery of the vehicle 9 viewed from the virtual view point is displayed on the display device 3. The synthetic image includes a vehicle image showing the shape of the vehicle 9 viewed from the virtual view point, and hence this vehicle image is also displayed on the display device 3.

The image processing apparatus 2 further includes a control unit 20, an operation accepting unit 25, a signal communication unit 26, and a memory unit 27. The control unit 20 is a microcomputer provided with, for example, a CPU, a RAM, and a ROM, and totally controls the image processing apparatus 2 as a whole.

The operation accepting unit 25 receives an operation signal output from the touch panel 31 and the operation button 4 when the user performs an operation. The operation accepting unit 25 accepts the user's operation by receiving the operation signal in this manner. The operation accepting unit 25 inputs the received operation signal to the control unit 20.

The signal communication unit 26 is connected to a vehicle-mounted network 8 such as a CAN, and transmits and receives signals with respect to other electronic apparatus provided on the vehicle 9. The vehicle-mounted network 8 includes an electronic apparatus such as a light control apparatus 81, a mirror control apparatus 82, a wiper control apparatus 83, a door lock control apparatus 84, and a window control apparatus 85 connected thereto.

The light control apparatus 81 controls illumination/extinction of a lighting apparatus such as a head light (front illumination lamp) of the vehicle 9. The light control apparatus 81 sends a state signal showing the state of illumination/extinction of the lighting apparatus to the vehicle control apparatus 10. Upon reception of an instruction signal in accordance with the user's operation from the vehicle control apparatus 10, the light control apparatus 81 illuminates or extinguishes an arbitrary lighting apparatus in response thereto.

The mirror control apparatus 82 controls retraction/deployment of the side mirrors of the vehicle 9. The mirror control apparatus 82 transmits a state signal showing the state of retraction/deployment of the side mirrors to the vehicle control apparatus 10. Upon reception of an instruction signal in accordance with the user's operation from the vehicle control apparatus 10, the mirror control apparatus 82 retracts or deploys the side mirrors in response thereto.

The wiper control apparatus 83 controls ON/OFF of the wipers of the vehicle 9. The wiper control apparatus 83 inputs a state signal indicating the ON/OFF state of the wipers to the vehicle control apparatus 10. In the case of receiving an instruction signal in accordance with the user's operation from the vehicle control apparatus 10, the wiper control apparatus 83 turns the arbitrary wiper ON or OFF in response to the instruction signal.

The door lock control apparatus 84 controls locking/unlocking of the doors of the vehicle 9. The door lock control apparatus 84 inputs a state signal indicating the locking/unlocking state of the doors to the vehicle control apparatus 10. In the case of receiving an instruction signal in accordance with the user's operation from the vehicle control apparatus 10, the door lock control apparatus 84 locks or unlocks an arbitrary door in response to the instruction signal.

The window control apparatus 85 controls OPEN/CLOSE of the windows of the vehicle 9. The window control apparatus 85 inputs a state signal indicating the OPEN/CLOSE state of the windows to the vehicle control apparatus 10. Upon reception of an instruction signal in accordance with the user's operation from the vehicle control apparatus 10, the window control apparatus 85 turns the arbitrary window OPEN or CLOSE in response thereto.

The memory unit 27 is, for example, a non-volatile memory such as a flush memory, and memorizes various items of information. The memory unit 27 memorizes a program 27a as a farm ware, and various data used by the image generating unit 22 for generating a synthetic image. As data used for generating the synthetic image as described above, a vehicle data 27b showing the shape of the vehicle 9 on which the vehicle control apparatus 10 is mounted is included.

Various functions of the control unit 20 are achieved by the CPU by performing arithmetic processing in accordance with the program 27a memorized in the memory unit 27. A display control unit 20a and a vehicle control unit 20b are part of the functions of the control unit 20 achieved by the CPU by performing the arithmetic processing in accordance with the program 27a.

The display control unit 20a controls the image generating unit 22 and the image output unit 24 to display various synthetic images on the display device 3. The display control unit 20a, for example, sets an enlargement factor of the synthetic image in accordance with the user's operation to cause the display device 3 to display a synthetic image including an image of an object and the vehicle image having a size in accordance with the enlargement factor. The display control unit 20a causes the display device 3 to display also command buttons configured to issue instructions to drive portions of the vehicle.

The vehicle control unit 20b controls portions of the vehicle 9 in accordance with the user's operation aimed at the command buttons. The vehicle control unit 20b transmits instruction signals for driving portions of the vehicle 9 via the signal communication unit 26 to the electronic apparatus such as the light control apparatus 81, the mirror control apparatus 82, the wiper control apparatus 83, the door lock control apparatus 84, and the window control apparatus 85. Accordingly, various portions of the vehicle 9 such as the lighting apparatus, the side mirrors, the wipers, the doors, and the windows are driven in accordance with the user's operation.

<1-2. Generation of Synthetic Image>

Figure 3:
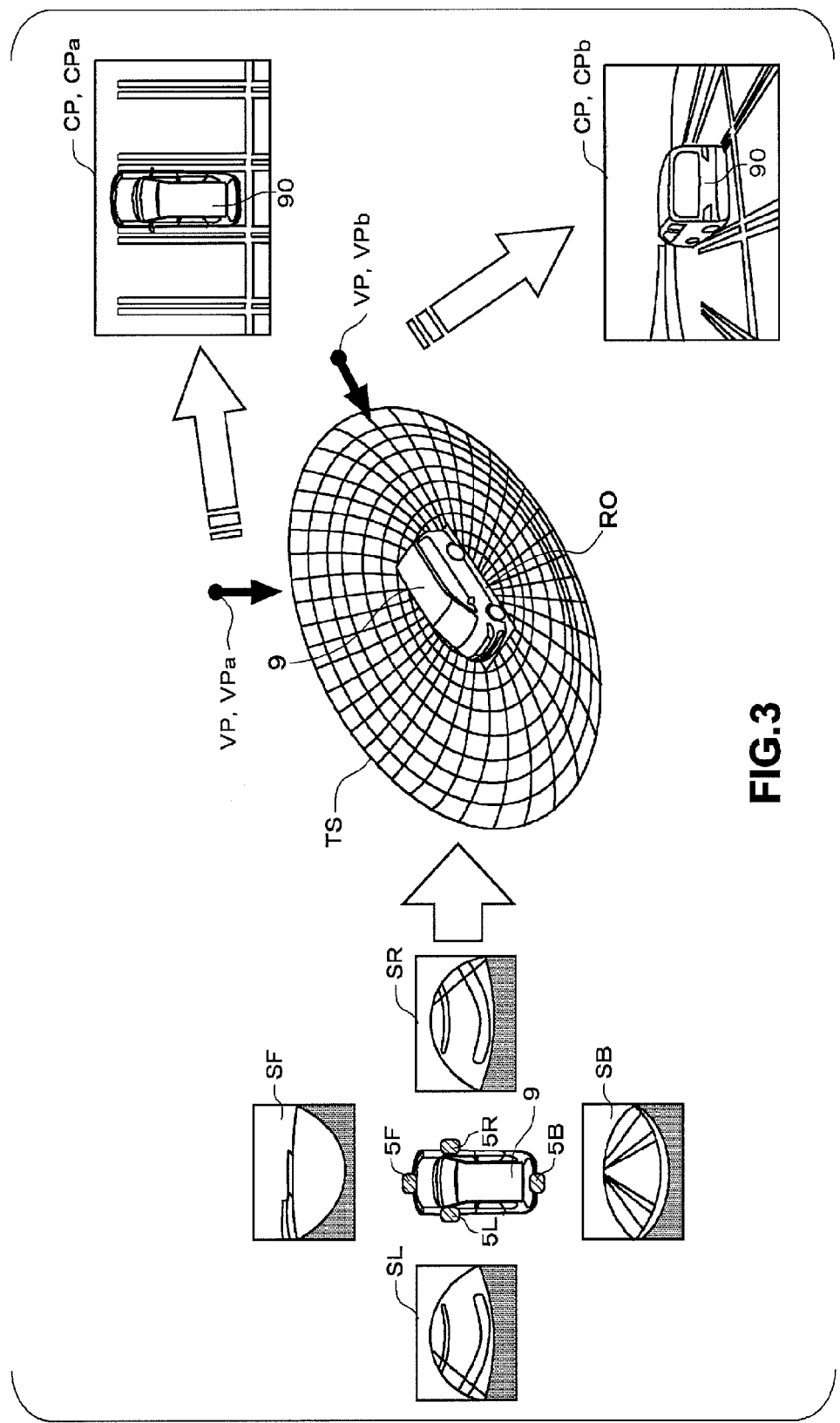
FIG. 3 is an explanatory drawing illustrating a method of generating a synthetic image.

Subsequently, a method in which the image generating unit 22 generates a synthetic image showing a state of the periphery of the vehicle 9 viewed from the virtual view point will be described. FIG. 3 is an explanatory drawing illustrating a method in which the image generating unit 22 generates a synthetic image.

When shooting is performed by each of the front camera 5F, the rear camera 5B, the left side camera 5L, and the right side camera 5R, four shot images SF, SB, SL, SR showing the front, rear, left and right of the vehicle 9 respectively are acquired. These four shot images SF, SB, SL, SR include data of the entire periphery of the vehicle 9 (image of the object).

The image generating unit 22 adheres (projects) the data included in these four shot images SF, SB, SL, SR (the image of the object) on a virtual plane TS, which is a three-dimensional curved surface set in a virtual three-dimensional space.

The virtual plane TS is a plane corresponding to an area in the periphery of the vehicle 9. The virtual plane TS has a substantially semi-spherical shape (bowl shape), for example, and a center area (the bottom portion of the bowl) is determined as a vehicle region R0, which corresponds to a position of the vehicle 9. The image generating unit 22 adheres data of the shot image to an area in the virtual plane TS outside the vehicle region R0.

The virtual plane TS is divided into a plurality of segments in a mesh pattern. Each segment which constitutes the virtual plane TS has a polygonal shape having three or four apexes. Each of the segments is associated with any area of four shot images SF, SB, SL, SR. The image generating unit 22 adheres data of each area of the four shot images SF, SB, SL, SR on a segment in the virtual plane TS associated therewith as a texture. The area in the shot image and the segment of the virtual plane TS to which the data is to be adhered are associated with each other with the data memorized in the memory unit 27 in advance.

The image generating unit 22 adheres data of the shot image SF of the front camera 5F on a segment of a front portion which corresponds to a front portion of the vehicle 9 in the virtual plane TS. The image generating unit 22 adheres data of the shot image SB of the rear camera 5B on a segment of a rear portion which corresponds to a rearward of the vehicle 9 in the virtual plane TS. In addition, the image generating unit 22 adheres data of the shot image SL of the left side camera 5L to a segment on a left side portion which corresponding to a left side of the vehicle 9 in the virtual plane TS, and adheres data of the shot image SR of the right side, camera 5R to a segment of a right side portion which corresponds to a right side of the vehicle 9 in the virtual plane TS.

In this manner, when adhering the data of the shot image to the virtual plane TS, then the image generating unit 22 virtually constitutes a vehicle model showing a three-dimensional shape of the vehicle 9 by using the vehicle data 27b memorized in the memory unit 27 in advance. This vehicle model is arranged in the vehicle region R0, which corresponds to the position of the vehicle 9, in the three-dimensional space in which the virtual plane TS is set.

Subsequently, the image generating unit 22 sets a virtual view point VP with respect to the three-dimensional space in which the virtual plane TS is set under control of the display control unit 20a. The virtual view point VP is defined by the position and the direction of a visual line. The image generating unit 22 is capable of setting the virtual view point VP at an arbitrary position in the three-dimensional space in the arbitrary direction of the visual line.

Subsequently, the image generating unit 22 cuts out part of the area of the virtual plane TS in accordance with the set virtual view point VP to generate the synthetic image. In other words, the image generating unit 22 cuts out data adhered to the area of the virtual plane TS included in a specific view angle viewed from the virtual view point VP (the image of the object) as a synthetic image. Accordingly, the image generating unit 22 generates a synthetic image CP showing the state of the periphery of the vehicle 9 (the image of the object) viewed from the virtual view point VP.

The image generating unit 22 performs rendering on a vehicle model in accordance with the virtual view point VP, and superimposes a vehicle image 90 obtained as a result on the synthetic image CP. Therefore, the synthetic image CP includes the vehicle image 90 showing the shape of the vehicle 9 viewed from the virtual view point VP, and shows the state of the periphery of the vehicle 9 viewed from the virtual view point VP and the shape of the vehicle 9 together.

For example, as illustrated in FIG. 3, when a virtual view point VPa located right above the vehicle 9 with a visual line thereof directed toward the center of the vehicle 9 is set, a synthetic image (overhead image) CPa showing the state of the periphery of the vehicle 9 viewed from right above the vehicle 9 and the shape of the vehicle 9 is generated. In the case where a virtual view point VPb located leftward and rearward of the vehicle 9 with a visual line thereof directed toward the center of the vehicle 9 is set, a synthetic image CPb showing the state of the periphery of the vehicle 9 viewed from rearward and leftward of the vehicle 9 and the shape of the vehicle 9 is generated. In this embodiment, the display control unit 20a controls the image generating unit 22 so that the visual line of the virtual view point VP is directed toward the center of the vehicle 9 irrespective of the position of the virtual view point VP.

The image generating unit 22 sets the view angle when cutting out the synthetic image CP is set in accordance with the enlargement factor at that moment. Accordingly, the image generating unit 22 adjusts (enlarges or contracts) the size of the image of the object included in the synthetic image CP in accordance with the enlargement factor at that moment. The image generating unit 22 adjusts (enlarges or contracts) the size of the vehicle image 90 to be superimposed on the synthetic image CP in accordance with the enlargement factor at that moment. Therefore, the synthetic image CP generated by the image generating unit 22 includes the image of the object and the vehicle image 90 having a size in accordance with the enlargement factor at that moment. The enlargement factor as described above may be changed by the display control unit 20a in accordance with the user's operation.

<1-3. User's Operation>

The function of the vehicle control apparatus 10 is activated when the user operates the operation button 4, for example. When the function of the vehicle control apparatus 10 is activated, the synthetic image CP generated by the image generating unit 22 is displayed on the display device 3. The user is capable of issuing an instruction for driving a portion of the vehicle 9 by performing the touch operation aimed at the command button displayed so as to be superimposed on the synthetic image CP.

However, in an initial state at the moment when the function of the vehicle control apparatus 10 is activated, such a command button is not displayed. In the initial state, as illustrated in FIG. 4, the synthetic image CP showing a state of the periphery of the vehicle 9 viewed from right above the vehicle 9 and the entire shape of the vehicle 9 is generated and is displayed on the display device 3.

Figure 5:
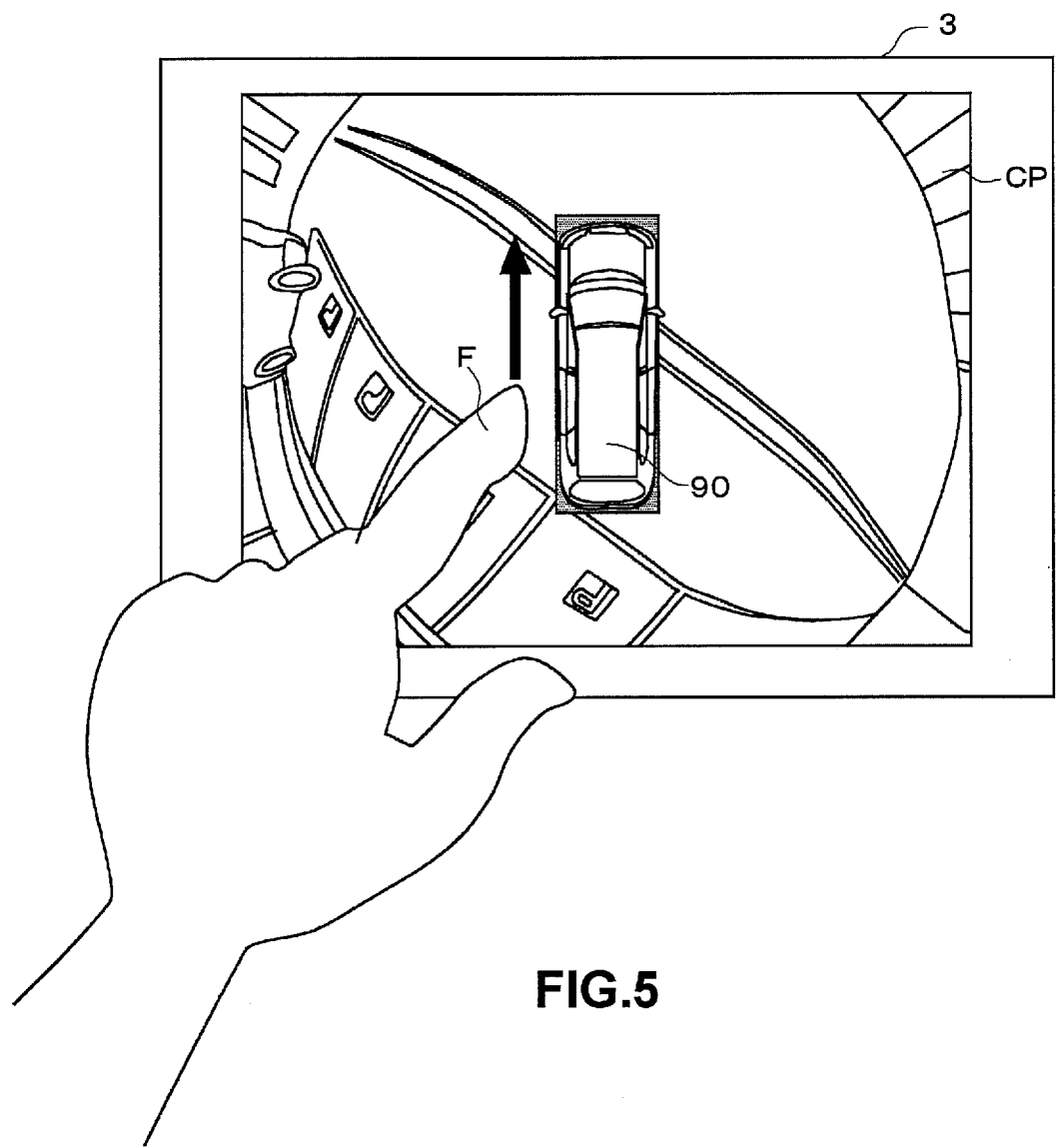
FIG. 5 is an explanatory drawing illustrating a flick operation.

In the case where the synthetic image CP including the vehicle image 90 is displayed on the display device 3 in this manner, the user is allowed to perform a user's operation which corresponds to an instruction for changing the vehicle image 90. For example, as illustrated in FIG. 5, the user is capable of performing a flick operation with respect to the screen of the display device 3 as an instruction for changing the vehicle image 90. The flick operation is an operation of touching the screen with a finger F and moving the finger F in one direction so as to swipe the screen, which is done by the user.

The flick operation is a user's operation which corresponds to an instruction for changing the position of the virtual view point VP and changing the direction of the vehicle image 90. In the case where the user performs the flick operation, the operation accepting unit 25 accepts the flick operation. The display control unit 20a then moves the position of the virtual view point VP in the direction opposite to the direction of the flick operation. Accordingly, the direction of the vehicle image 90 included in the synthetic image CP is changed.

Figure 4:
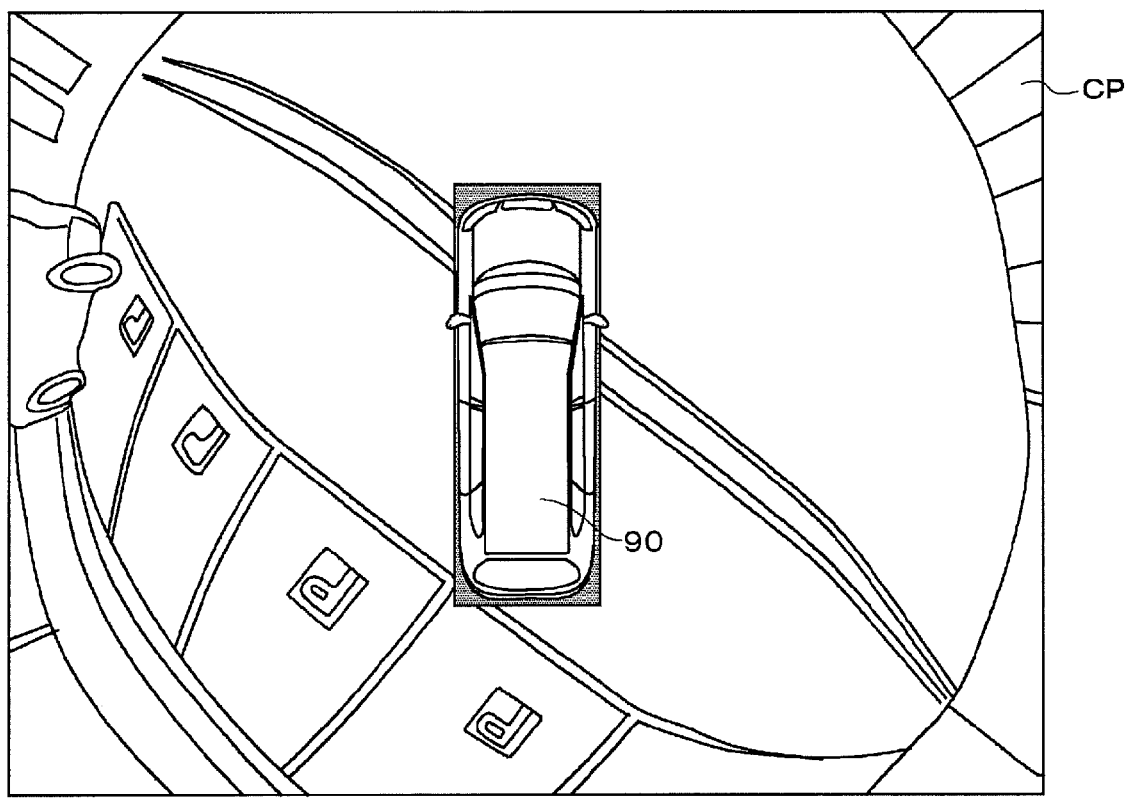
FIG. 4 is a drawing illustrating an example of the synthetic image including a vehicle image.
Figure 6:
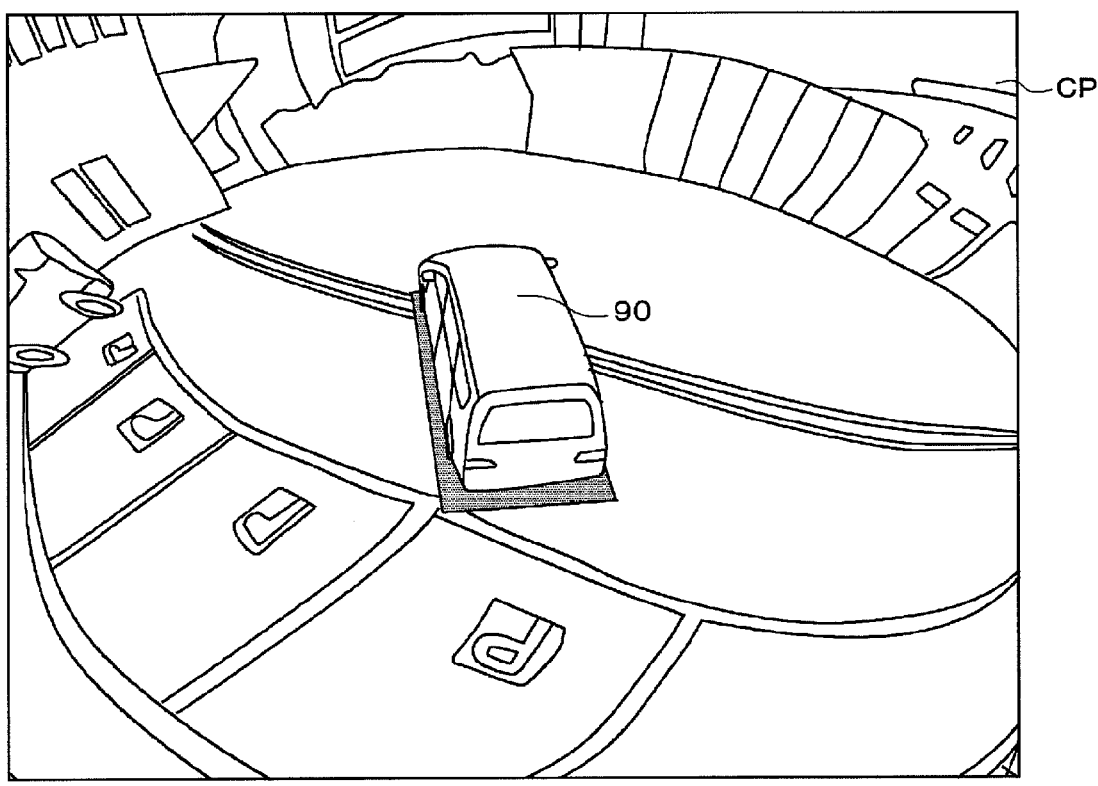
FIG. 6 is a drawing illustrating an example of the synthetic image including the vehicle image.

For example, if the user performs the flick operation upward of the synthetic image CP as illustrated in FIG. 5 in the case where the synthetic image CP illustrated in FIG. 4 is displayed, the display control unit 20a moves the position of the virtual view point VP in the direction downward of the synthetic image CP (rearward of the vehicle 9, in this case). Accordingly, as illustrated in FIG. 6, the synthetic image CP showing the state of the periphery of the vehicle 9 viewed from the virtual view point VP (rearward of the vehicle 9) after the change is generated and displayed on the display device 3. The synthetic image CP includes the vehicle image

90 showing the shape of the vehicle 9 viewed from the virtual view point VP (rearward of the vehicle 9) after the change.

Figure 7:
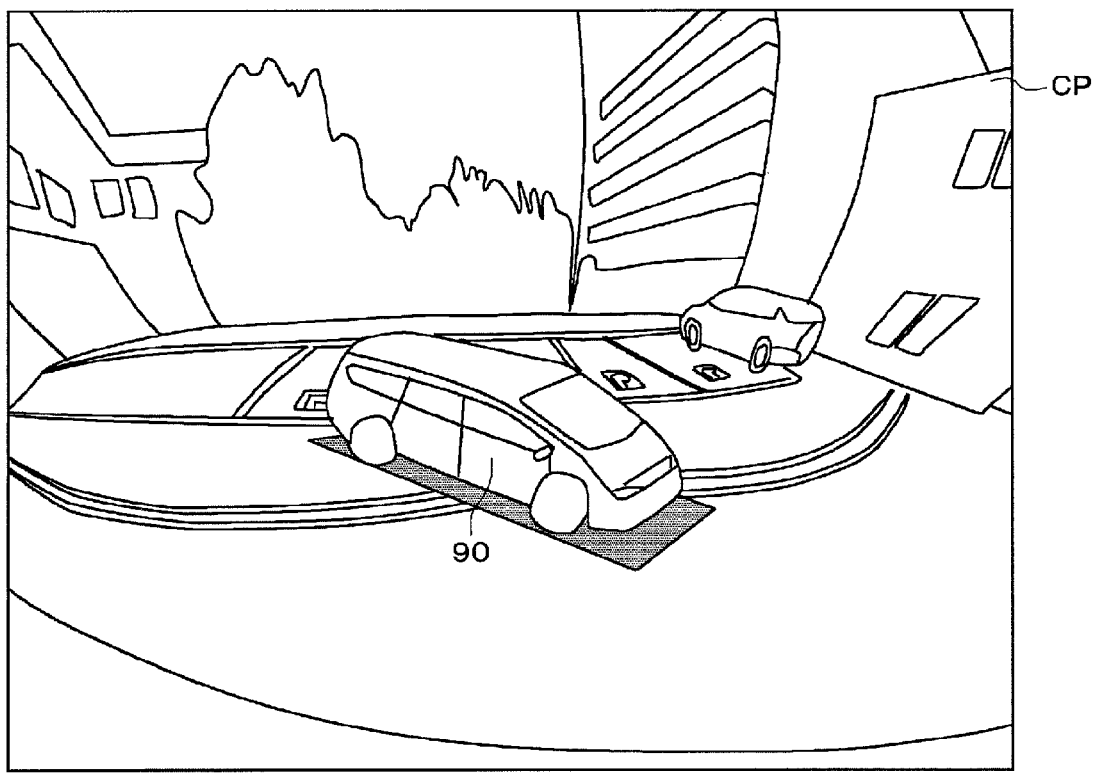
FIG. 7 is a drawing illustrating an example of the synthetic image including the vehicle image.

If the user performs the flick operation leftward of the synthetic image CP in the case where the synthetic image CP illustrated in FIG. 6 is displayed, the display control unit 20*a* moves the position of the virtual view point VP in the direction rightward of the synthetic image CP (rightward of the vehicle 9, in this case). Accordingly, as illustrated in FIG. 7, the synthetic image CP showing the state of the periphery of the vehicle 9 viewed from the virtual view point VP (rightward of the vehicle 9) after the change is generated and displayed on the display device 3. The synthetic image CP includes the vehicle image 90 showing the shape of the vehicle 9 viewed from the virtual view point VP (rightward of the vehicle 9) after the change.

In this manner, since the position of the virtual view point VP is changed in response to the flick operation by the user, the user is capable of confirming the state of the periphery of the vehicle 9 and the shape of the vehicle 9 from a desired viewpoint.

Figure 8:
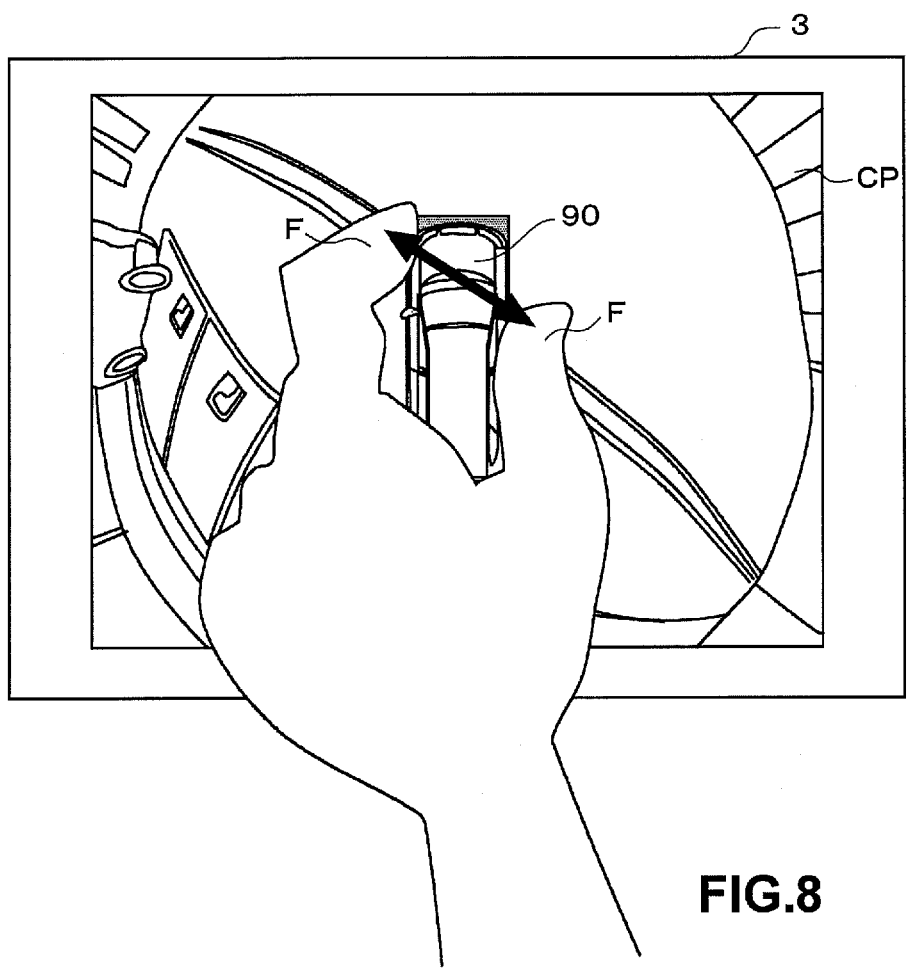
FIG. 8 is an explanatory drawing illustrating a pinch operation.

In addition to the flick operation, the user, is also capable of performing a pinch operation (a pinch-out operation and a pinch-in operation) with respect to the screen of the display device 3 as illustrated in FIG. 8 as an instruction for changing the vehicle image 90. The pinch operation is an operation that the user touches the screen with two fingers F and then changes the distance between the fingers F. The pinch-out operation is an operation for increasing the distance between the fingers F, and the pinch-in operation is an operation for decreasing the distance between the fingers F.

The pinch operation is a user's operation which corresponds to an instruction for changing the enlargement factor of the synthetic image CP. The pinch-out operation is a user's operation which corresponds to an instruction for enlarging the image of the object and the vehicle image 90 included in the synthetic image CP. In contrast, the pinch-in operation is a user's operation which corresponds to an instruction for reducing the image of the object and the vehicle image 90 included in the synthetic image CP.

In the case where the user performs the pinch operation, the operation accepting unit 25 accepts the pinch operation. The display control unit 20*a* increases the enlargement factor in accordance with an amount of movement of the fingers F when the pinch-out operation is performed, and the enlargement factor is reduced in accordance with the amount of movement of the fingers F when the pinch-in operation is performed. Accordingly, the image of the object and the vehicle image 90 included in the synthetic image CP are enlarged or reduced. When the pinch-out operation is performed, the image of the object and the vehicle image 90 included in the synthetic image CP are enlarged with the position where the fingers F touch first as a center.

For example, if the user performs the pinch-out operation as illustrated in FIG. 8 in the case where the synthetic image CP illustrated in FIG. 4 is displayed, the display control unit 20*a* increases the enlargement factor. Accordingly, as illustrated in FIG. 9, the synthetic image CP showing the image of the object and the vehicle image 90 in an enlarged scale is generated around a point in the front of the vehicle image 90 where the fingers F touch first as a center, and is displayed on the display device 3.

Figure 9:
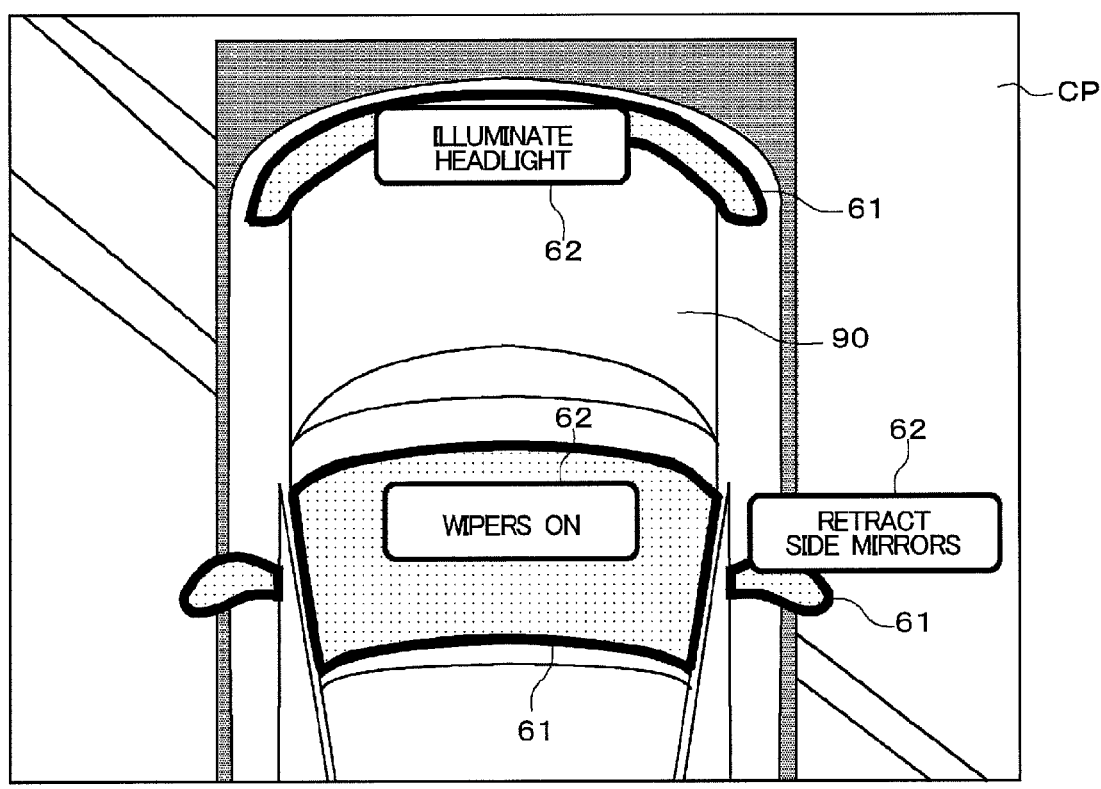
FIG. 9 is a drawing illustrating an example of the synthetic image including the vehicle image after an enlargement.

When the enlargement factor after the change exceeds a threshold value, the display control unit 20*a* displays command buttons 62 on the display device 3 as illustrated in FIG. 9. The command buttons 62 described above correspond to the portions of the vehicle 9 respectively, and the user is capable of issuing an instruction for driving the respective portions by performing the touch operation aimed at the command buttons 62. The display control unit 20*a* causes the display device 3 to display the command buttons 62 corresponding to the portions of the vehicle 9 shown by the vehicle image 90 after the enlargement.

In the synthetic image CP, the portion of the vehicle 9 as an object to be controlled by the vehicle control apparatus 10 (the portion which can be controlled by the vehicle control apparatus 10) shown by the vehicle image 90 after the enlargement (the portion included in the synthetic image CP) is specified. The specified portion of the vehicle 9 is emphasized by being surrounded by a frame 61 as portions to be controlled, and the command buttons 62 relating to the corresponding portion is displayed. Therefore, the command buttons 62 of the portions which are not shown by the vehicle image 90 (the portion not included in the synthetic image CP) are not displayed even though the portion is a portion to be controlled by the vehicle control apparatus 10. The command buttons 62 are displayed in the vicinity of the corresponding portions of the vehicle image 90 in an superimposed manner.

In the example illustrated in FIG. 9, a headlight, a front glass, and the side mirrors, which are portions shown by the vehicle image 90 (portion included in the synthetic image CP) are surrounded by the frame 61 as the portion to be controlled. In the vicinity of the headlight, the command button 62 for issuing an instruction for illuminating the headlight is displayed. The command button 62 for issuing an instruction for turning the wipers of the front glass ON is displayed in the vicinity of the front glass and the command button 62 for issuing an instruction for retracting the side mirrors is displayed in the vicinity of the side mirror.

If the user performs a touch operation aiming at the command buttons 62 in the case where the command buttons 62 are displayed as illustrated in FIG. 9, the operation accepting unit 25 accepts this user's operation. The vehicle control unit 20*b* controls portions of the vehicle 9 corresponding to the aimed command buttons 62.

For example, in the case where the user performs a touch operation aiming at the command button 62 in the vicinity of the headlight illustrated in FIG. 9, the vehicle control unit 20*b* transmits an instruction signal for illuminating the headlight to the light control apparatus 81. Accordingly, the light control apparatus 81 illuminates the headlight in response to this instruction signal.

The instructions in association with the command buttons 62 reflect the states of the portions corresponding to the command buttons 62 in question indicated by the state signals at that moment. For example, in the case where the headlight is in the state of being extinguished, the command button 62 for issuing an instruction for illuminating the headlight is displayed. In contrast, in the case where the headlight is in the illuminated state, the command button 62 for issuing an instruction for extinguishing the headlight is displayed.

When the user's operation that issues an instruction for enlarging the vehicle image 90 is performed in this manner, the display control unit 20*a* causes the display device 3 to display the synthetic image CP including the vehicle image 90 after enlargement. The display control unit 20*a* then causes the display device 3 to display only the command buttons 62 corresponding to portions of the vehicle 9 that the vehicle image 90 after enlargement shows, and does not allow the command buttons 62 corresponding to the portions of the vehicle 9 that the vehicle image 90 after enlargement does not show to be displayed. Therefore, in comparison with the case where the command buttons 62 corresponding to all of the portions of the vehicle 9 to be controlled are displayed on one screen of the display device 3, the number of the command buttons 62 to be displayed on the screen may be reduced. Therefore, the user can easily grasp the correspondence relation between the portions of the vehicle 9 and the command buttons 62, and hence the operation error of the user is prevented.

If the user performs the flick operation with respect to the screen of the display device 3 in the case where the synthetic image CP including the vehicle image 90 after the enlargement is displayed on the display device 3 as illustrated in FIG. 9 as well, the position of the virtual view point VP is changed.

In this case, the display control unit 20a causes the display device 3 to display the synthetic image CP including the vehicle image 90 showing the shape of the vehicle 9 viewed from the virtual view point VP after the changing of the virtual view point VP while maintaining the enlargement factor of the synthetic image CP. The display control unit 20a causes the display device 3 to display only the command buttons 62 corresponding to the portions of the vehicle 9 shown by the vehicle image 90 viewed from the virtual view point VP after the changing of the virtual view point VP.

For example, if the user performs the flick operation upward of the synthetic image CP in the case where the synthetic image CP illustrated in FIG. 9 is displayed, the display control unit 20a moves the position of the virtual view point VP in the direction downward of the synthetic image CP (rearward of the vehicle 9, in this case) while maintaining the enlargement factor. Accordingly, as illustrated in FIG. 10, the synthetic image CP including the vehicle image 90 showing the shape of the vehicle 9 viewed from the rear of the vehicle 9 is generated and displayed on the display device 3.

Figure 10:
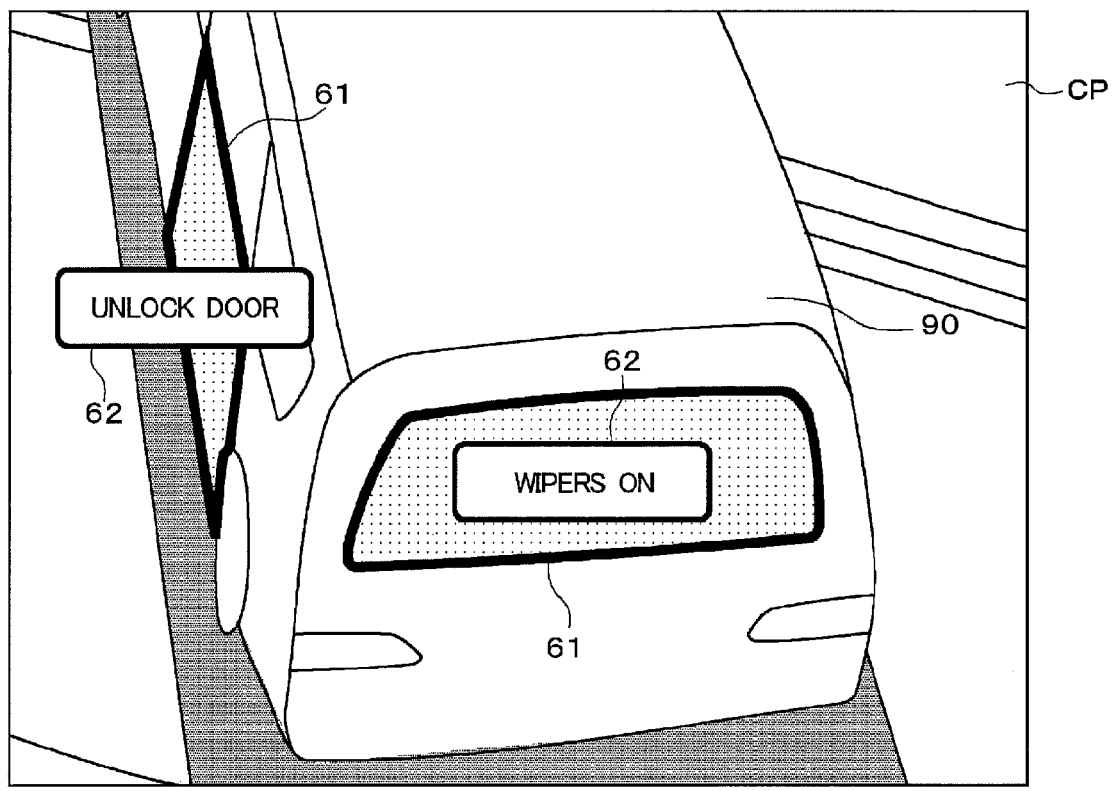
FIG. 10 is a drawing illustrating an example of the synthetic image including the vehicle image after the enlargement.

In the example illustrated in FIG. 10, a rear glass and a rear door, which are portions shown by the vehicle image 90 (portion included in the synthetic image CP) are surrounded by the frames 61 as the portions to be controlled. The command buttons 62 are displayed in the vicinity of these portions, respectively. In other words, the command button 62 for issuing an instruction for turning the wipers of the rear glass ON is displayed in the vicinity of the rear glass and the command button 62 for issuing an instruction for unlocking the rear door is displayed in the vicinity of the rear door. The synthetic image CP having the same configuration as that illustrated in FIG. 10 may be displayed on the display device 3 also if the user performs the pinch-out operation in the case where the synthetic image CP illustrated in FIG. 6 is displayed.

If the user performs the flick operation leftward of the synthetic image CP in the case where the synthetic image CP illustrated in FIG. 10 is displayed, the display control unit 20a moves the position of the virtual view point VP in the direction rightward of the synthetic image CP (rightward of the vehicle 9, in this case) while maintaining the enlargement factor. Accordingly, as illustrated in FIG. 11, the synthetic image CP including the vehicle image 90 showing the shape of the vehicle 9 viewed from the right of the vehicle 9 is generated and displayed on the display device 3.

Figure 11:
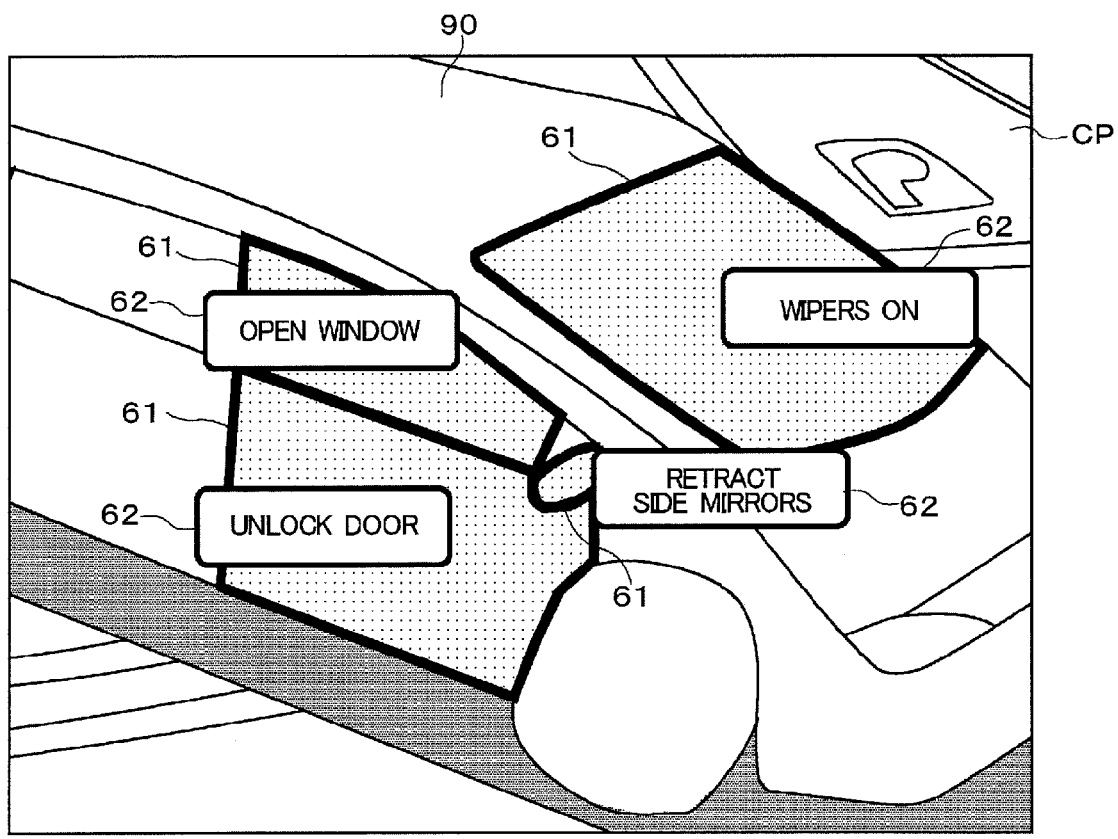
FIG. 11 is a drawing illustrating an example of the synthetic image including the vehicle image after the enlargement.

In the example illustrated in FIG. 11, the front glass, the side mirror, a front window, and a front door which are portions shown by the vehicle image 90 (portion included in the synthetic image CP) are surrounded by the frames 61 as the portions to be controlled. The command buttons 62 are displayed in the vicinity of these portions, respectively. In other words, the command button 62 for issuing an instruction for turning the wipers of the front glass ON is displayed in the vicinity of the front glass and the command button 62 for issuing an instruction for retracting the side mirrors is displayed in the vicinity of the side mirror. The command button 62 for issuing an instruction for opening the front window is displayed in the vicinity of the front window and the command button 62 for issuing an instruction for unlocking the front door is displayed in the vicinity of the front door. The synthetic image CP having the same configuration as that illustrated in FIG. 11 may be displayed on the display device 3 also if the user performs the pinch-out operation in the case where the synthetic image CP illustrated in FIG. 7 is displayed.

In this manner, when the user's operation that issues an instruction for changing the virtual view point is performed, the display control unit 20a changes the position of the virtual view point VP, and causes the display device 3 to display the vehicle image 90 showing the shape of the vehicle 9 viewed from the virtual view point VP after the changing of the virtual view point VP. The display control unit 20a then causes the display device 3 to display only the command buttons 62 corresponding to portions of the vehicle 9 that the vehicle image 90 viewed from the virtual view point VP after the changing of the virtual view point VP shows, and does not allow the command buttons 62 corresponding to the portions of the vehicle 9 that the vehicle image 90 viewed from the virtual view point VP after the changing of the virtual view point VP does not show to be displayed. Therefore, in comparison with the case where the command buttons 62 corresponding to all of the portions of the vehicle 9 to be controlled are displayed on one screen of the display device 3, the number of the command buttons 62 to be displayed on the screen may be reduced. Therefore, the user can easily know the correspondence relation between the portions of the vehicle 9 and the command buttons 62, and hence the operation error of the user is prevented.

In the display device 3, the vehicle image 90 is displayed so as to be included in the synthetic image CP which shows the state of the periphery of the vehicle 9 when viewed from the virtual view point VP. In the case where the user issues an instruction for driving a portion of the vehicle 9, the user tends to direct not much attention to the periphery of the vehicle 9. In contrast, by displaying the synthetic image CP in this manner, the user is allowed to issue an instruction for driving the portion of the vehicle 9 while confirming the state of the periphery of the vehicle 9 by using the synthetic image CP. Therefore, for example, in the case where other vehicles are approaching to his or her own vehicle 9, the user can determine not to unlock a rear door of the vehicle 9 for avoiding contact between a passenger on a rear seat of the vehicle 9 and the approaching vehicle.

<1-4. Flow of Process>

Figure 12:
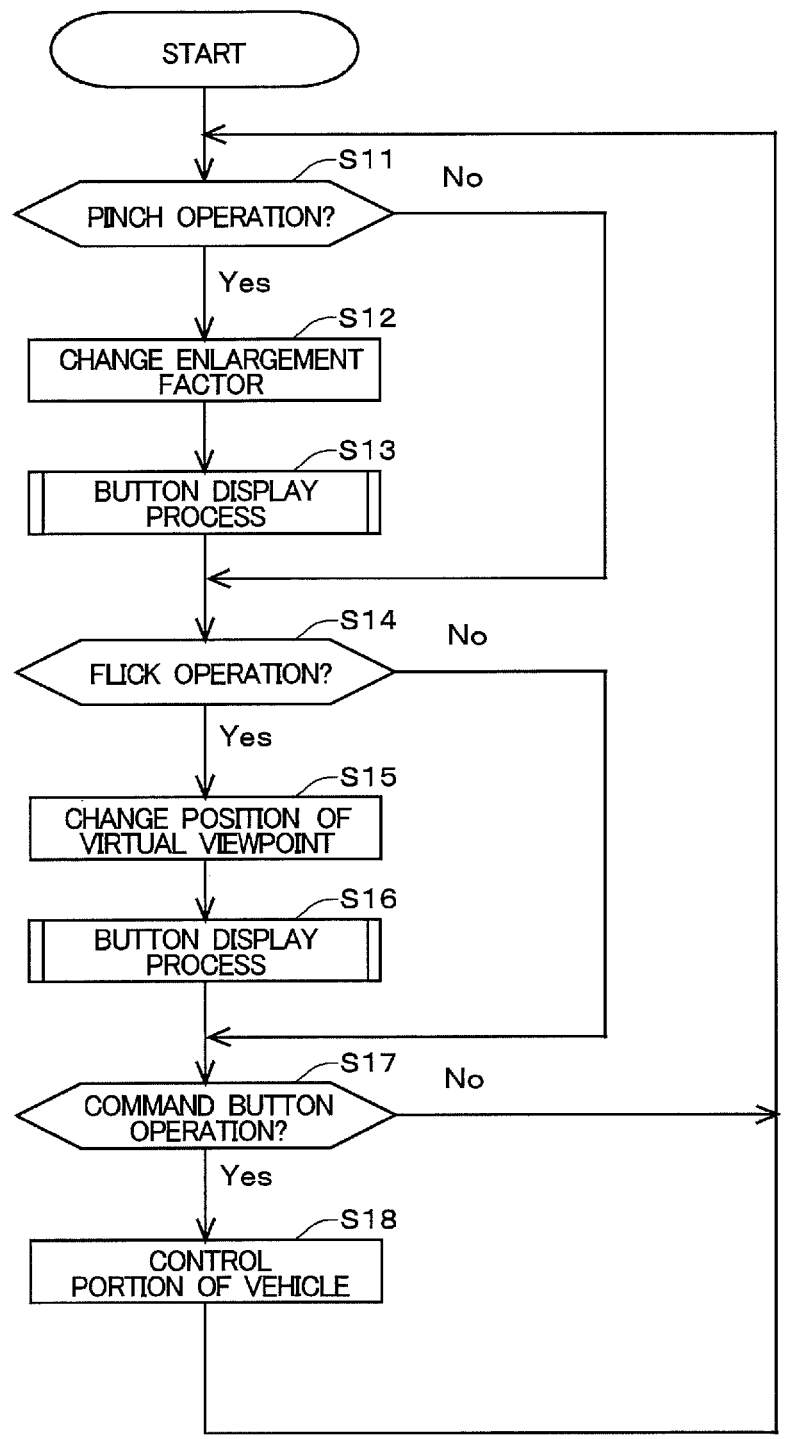
FIG. 12 is a drawing illustrating a flow of processes of a user's operation of the vehicle control apparatus.

FIG. 12 is a drawing illustrating a flow of processes of a user's operation of the vehicle control apparatus 10. When the function of the vehicle control apparatus 10 is activated, a process illustrated in FIG. 12 is executed. In parallel to the process illustrated in FIG. 12, a process of generating the synthetic image CP including the vehicle image 90 by the image generating unit 22 and displaying the synthetic image CP by the display device 3 is repeated at a predetermined cycle (for example, a cycle of 1/30 seconds). Accordingly, the synthetic image CP showing the state of the periphery of the vehicle 9 and the shape of the vehicle 9 viewed from the virtual view point VP in real time is displayed on the display device 3.

A flow of a process relating to the user's operation illustrated in FIG. 12 will be described below. In this process, the control unit 20 monitors whether or not the operation accepting unit 25 accepts the user's operation. When the user's operation is accepted, the control unit 20 determines which operation out of the pinch operation, the flick operation, and the touch operation aiming at the command buttons 62 the operation accepting unit 25 has accepted (Steps S11, S14, S17).

In the case where the operation accepting unit 25 accepts the pinch operation, which is a user's operation that issues an instruction for changing the enlargement factor of the synthetic image CP (Yes in Step S11), the display control unit 20*a* changes the enlargement factor (Step S12). Accordingly, from then onward, the synthetic image CP including the image of the object and the vehicle image 90 having a size in accordance with the enlargement factor after the change is generated and is displayed on the display device 3. When the operation accepting unit 25 accepts the pinch-out operation, the synthetic image CP including the vehicle image 90 after the enlargement is displayed on the display device 3.

Subsequently, the display control unit 20*a* performs a button display process for causing the display device 3 to display the command buttons 62 corresponding to the portions of the vehicle 9 shown by the vehicle image 90 (Step S13).

Figure 13:
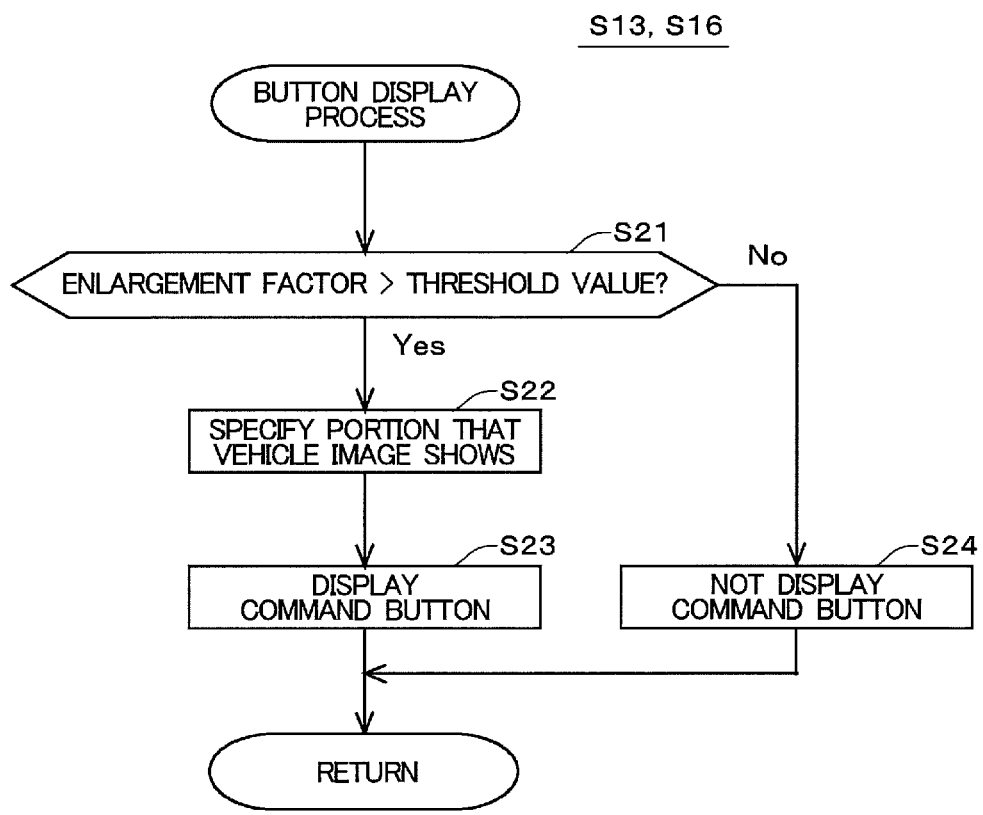
FIG. 13 is a drawing illustrating a flow of a button display process.

FIG. 13 is a drawing illustrating a flow of the button display process. First of all, the display control unit 20*a* determines whether or not the enlargement factor after the change exceeds a predetermined threshold value (Step S21). In the case where the enlargement factor after the change does not exceed the threshold value (No in Step S21), the display control unit 20*a* does not display the command buttons 62 (Step S24).

In contrast, in the case where the enlargement factor after the change exceeds the threshold value (Yes in Step S21), the display control unit 20*a* specifies a portion shown by the vehicle image 90 (the portion included in the synthetic image CP) out of the portions to be controlled by the vehicle control apparatus 10 on the basis of the virtual view point VP and the enlargement factor (Step S22).

The display control unit 20*a* causes the frames 61 and the command buttons 62 corresponding to the specified portions so as to be superimposed on the synthetic image CP (Step S23). Accordingly, in the case where the operation accepting unit 25 accepts the pinch-out operation, only the command buttons 62 corresponding to the portions of the vehicle 9 shown by the vehicle image 90 after the enlargement is displayed on the display device 3. When there is no portion specified in Step S22, the command buttons 62 are not displayed.

Returning back to FIG. 12, in the case where the operation accepting unit 25 accepts the flick operation, which is a user's operation that issues an instruction for changing the position of the virtual view point VP (Yes in Step S14), the display control unit 20*a* changes the position of the virtual view point VP (Step S15). Accordingly, the synthetic image CP including the vehicle image 90 showing the shape of the vehicle 9 viewed from the virtual view point VP after the changing of the position of the virtual view point VP is generated and displayed on the display device 3 from then onward.

Subsequently, the display control unit 20*a* performs the button display process for causing the display device 3 to display the command buttons 62 corresponding to the portions of the vehicle 9 shown by the vehicle image 90 (Step S16). In this case as well, the button display process illustrated in FIG. 13 is performed.

First of all, the display control unit 20*a* determines whether or not the enlargement factor at that moment exceeds a predetermined threshold value (Step S21). In the case where the enlargement factor does not exceed the threshold value (No in Step S21), the display control unit 20*a* does not display the command buttons 62 (Step S24). The threshold value to be used for the comparison with the enlargement factor may be changed in accordance with the position of the virtual view point VP after the change.

In contrast, in the case where the enlargement factor exceeds the threshold value (Yes in Step S21), the display control unit 20*a* specifies a portion shown by the vehicle image 90 (the portion included in the synthetic image CP) out of the portions to be controlled by the vehicle control apparatus 10 on the basis of the virtual view point VP after the change and the enlargement factor (Step S22).

The display control unit 20*a* displays the frames 61 and the command buttons 62 corresponding to the specified portions so as to be superimposed on the synthetic image CP (Step S23). Accordingly, in the case where the operation accepting unit 25 accepts the flick operation, only the command buttons 62 corresponding to the portions of the vehicle 9 shown by the vehicle image 90 viewed from the virtual view point VP after the changing of the position of the virtual view point VP is displayed on the display device 3. When there is no portion specified in Step S22, the command buttons 62 are not displayed.

Returning back to FIG. 12, when the operation accepting unit 25 accepts the touch operation aiming at the command button 62 (Yes in Step S17), the vehicle control unit 20*b* controls the portion of the vehicle 9 corresponding to the command button 62 in question (Step 18). The vehicle control unit 20*b* transmits instruction signals to an electronic apparatus such as the light control apparatus 81, the mirror control apparatus 82, the wiper control apparatus 83, the door lock control apparatus 84, and the window control apparatus 85 via the signal communication unit 26 to drive the portion of the vehicle 9.

As described above, in the vehicle control apparatus 10 of this embodiment, the display device 3 displays the vehicle image 90 showing the shape of the vehicle 9 viewed from the virtual view point VP, and the operation accepting unit 25 accepts the user's operation. The display control unit 20*a* causes the display device 3 to display the vehicle image 90 after the change of the vehicle image 90 when the operation accepting unit 25 accepts the user's operation that issues the instruction for changing the vehicle image 90. Simultaneously, the display control unit 20*a* causes the display device 3 to display the command buttons 62 corresponding to the portions of the vehicle 9 shown by the vehicle image 90 after the change of the vehicle image 90. When the operation accepting unit 25 accepts the user's operation aiming at the command button 62, the vehicle control unit 20*b* controls the portion of the vehicle 9 corresponding to the command button 62 in question. Therefore, only the required command button 62 is displayed, and hence the operation error of the user is prevented.

The display control unit 20*a* causes the display device 3 to display the vehicle image 90 after the enlargement when the operation accepting unit 25 accepts the user's operation that issues the instruction for enlarging the vehicle image 90. Simultaneously, the display control unit 20*a* causes the display device 3 to display the command buttons 62 corresponding to the portions of the vehicle 9 shown by the vehicle image 90 after the enlargement.

Therefore, only the command buttons 62 corresponding to the portions of the vehicle 9 shown by the vehicle image 90 after the enlargement are displayed on the display device 3. Therefore, the number of the command buttons 62 to be displayed on the display device 3 may be reduced, and hence the operation error of the user is prevented.

In the case where the operation accepting unit 25 accepts the user's operation that issues an instruction for changing the virtual view point VP, the display control unit 20a causes the display device 3 to display the vehicle image 90 showing the shape of the vehicle 9 viewed from the virtual view point VP after the changing of the virtual view point VP. Simultaneously, the display control unit 20a causes the display device 3 to display the command buttons 62 corresponding to the portions of the vehicle 9 and shown by the vehicle image 90 viewed from the virtual view point VP after the changing of the virtual view point VP.

Therefore, vehicle images 90 viewed from various viewpoints desired by the user are displayed, and only the command buttons 62 corresponding to the portions of the vehicle 9 shown by the vehicle image 90 are displayed on the display device 3.

Therefore, the number of the command buttons 62 to be displayed on the display device 3 may be reduced, and hence the operation error of the user is prevented.

In the vehicle control apparatus 10, the synthetic image CP showing the periphery of the vehicle 9 viewed from the virtual view point VP is generated by using a plurality of shot images obtained by the image generating unit 22 by shooting the periphery of the vehicle 9. The display device 3 displays the synthetic image CP including the vehicle image 90. Therefore, the user is capable of issuing an instruction for controlling parts of the vehicle 9 while confirming the state of the periphery of the vehicle 9 with the synthetic image CP.

<2. Second Embodiment>

Subsequently, a second embodiment will be described. A configuration and actions of the vehicle control apparatus 10 of the second embodiment are almost the same as those in the first embodiment. Therefore, different points from the first embodiment will mainly be described.

In the first embodiment, in the case where the enlargement factor exceeds the predetermined threshold value, all of the command buttons 62 corresponding to portions which are the objects to be controlled by the vehicle control apparatus 10 and shown by the vehicle image 90 are displayed. In contrast, in the second embodiment, only the command button 62 which is to be controlled by the vehicle control apparatus 10 and relating to one portion selected from the portions shown by the vehicle image 90 is displayed.

In this embodiment, first of all the display control unit 20a causes the display device 3 to display a synthetic image CP which does not include the command button 62 even though the enlargement factor exceeds the predetermined threshold value. In the synthetic image CP, the portions of the vehicle 9 as portions to be controlled by the vehicle control apparatus 10 shown by the vehicle image 90 (the portion included in the synthetic image CP) are surrounded by the frames 61 and emphasized.

The user performs the touch operation to issue an instruction for selecting one portion out of the portions emphasized by the frames 61. In the case where the user performs the touch operation with respect to any one of the portions emphasized by the frames 61, the operation accepting unit 25 accepts the user's operation. The vehicle control unit 20b then selects the one portion determined as an object of touch operation, and causes the display device 3 to display only the command button 62 corresponding to the portion in question.

Figure 14:
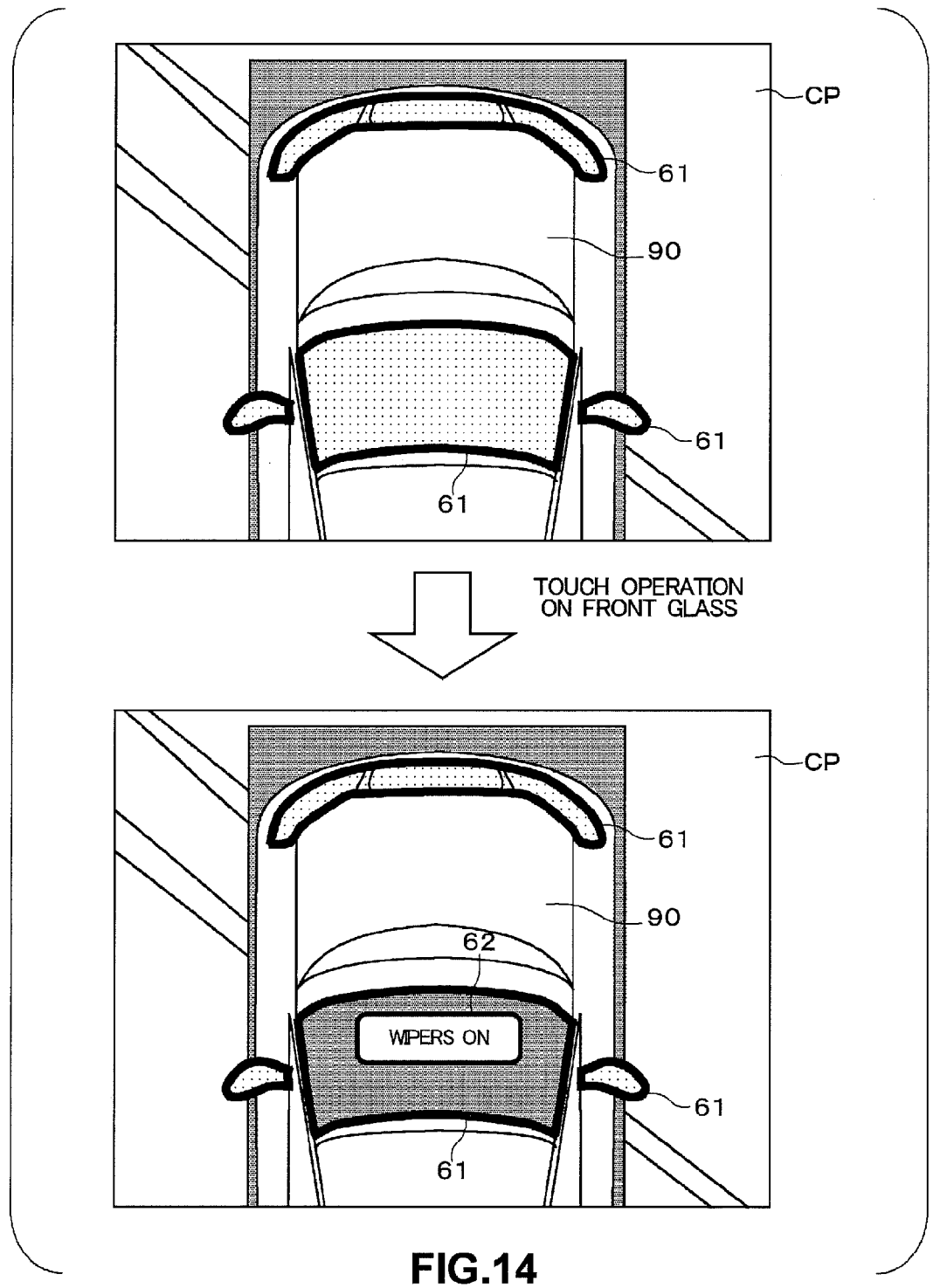
FIG. 14 is a drawing illustrating an example of display of a command button.

For example, a case where the synthetic image CP including the vehicle image 90 after the enlargement viewed from right above the vehicle 9 is displayed as illustrated in FIG. 14 is assumed. As illustrated in an upper portion in FIG. 14, the headlight, the front glass, and the side mirrors, which are portions shown by the vehicle image 90 are emphasized by the frames 61 as the portions to be controlled without displaying any command button 62. When the user performs the touch operation aiming at the front glass, only the command button 62 corresponding to the front glass is displayed on the display device 3 as illustrated in a lower portion of FIG. 14. The user performs the touch operation further aiming at this command button 62, and hence is capable of issuing an instruction for turning the wiper of the front glass ON.

Figure 15:
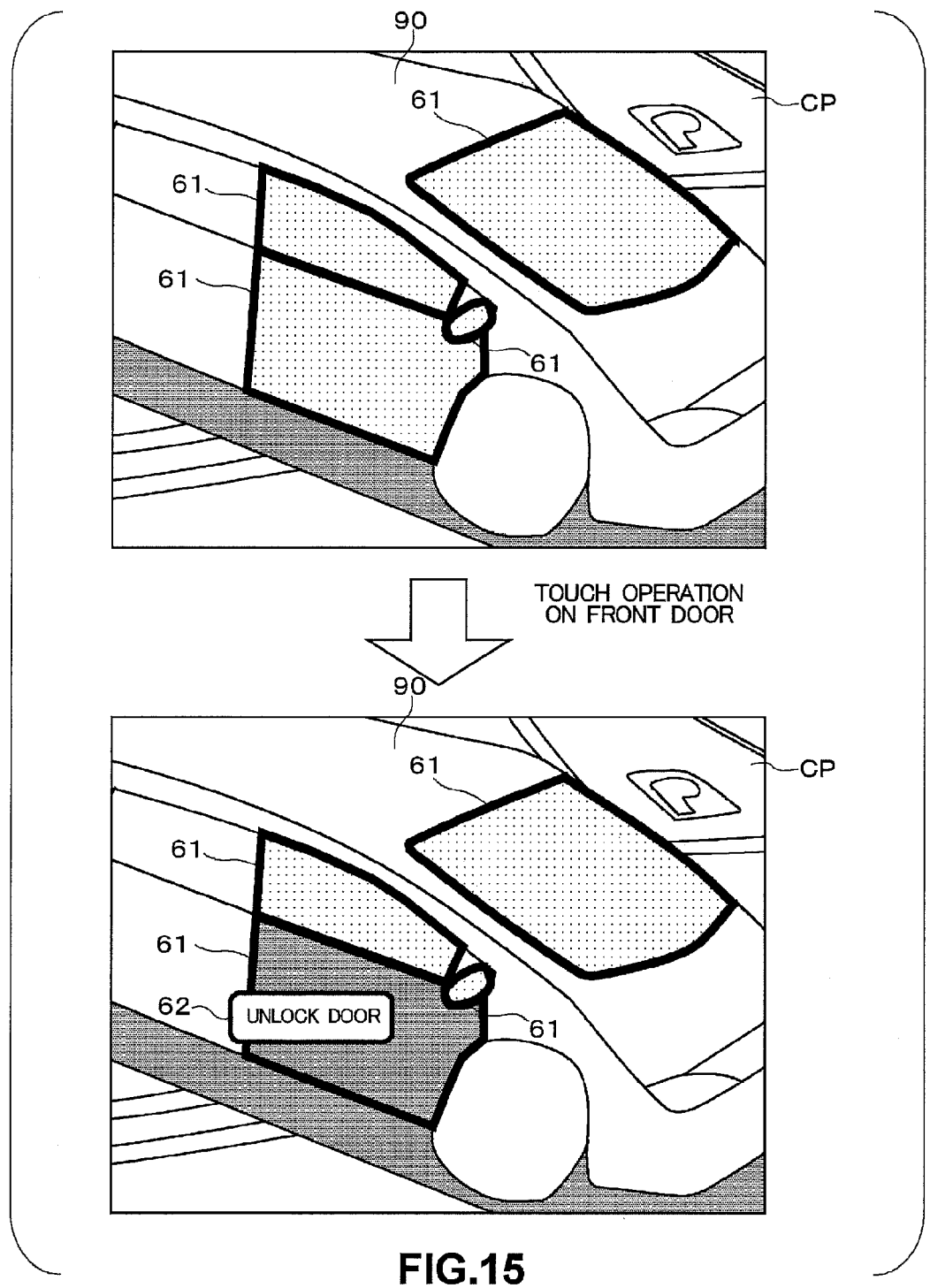
FIG. 15 is a drawing illustrating an example of display of the command button.

Also, a case where the synthetic image CP including the vehicle image 90 after the enlargement viewed from the right of the vehicle 9 is displayed as illustrated in FIG. 15, for example, is assumed. As illustrated in an upper portion in FIG. 15, the front glass, the side mirrors, the front window, and the front door, which are portions shown by the vehicle image 90 are emphasized by the frames 61 as the portions to be controlled without displaying any command button 62. When the user performs the touch operation aiming at the front door, only the command button 62 corresponding to the front door is displayed on the display device 3 as illustrated in a lower portion of FIG. 15. The user performs the touch operation further aiming at this command button 62, and hence is capable of issuing an instruction for unlocking the front door.

As described above, in the second embodiment, in the case where the operation accepting unit 25 receives the user's operation that issues an instruction for selecting the one portion of the vehicle 9 shown by the vehicle image 90, the display control unit 20a causes the display device 3 to display the command button 62 corresponding to the one portion. Therefore, the number of the command buttons 62 to be displayed on the display device 3 may be reduced dramatically, and hence the operation error of the user is effectively prevented.

<3. Third Embodiment>

Subsequently, a third embodiment will be described. A configuration and actions of the vehicle control apparatus 10 of the third embodiment are almost the same as those in the first embodiment. Therefore, different points from the first embodiment will mainly be described below.

The vehicle control apparatus 10 of the third embodiment includes a vehicle control mode and a periphery confirmation mode as operation modes. The vehicle control mode is an operation mode in which the user is allowed to drive a portion of the vehicle 9 as in the first embodiment. In contrast, the periphery confirmation mode is an operation mode in which the user confirms the state of the periphery of the vehicle 9.

Figure 16:
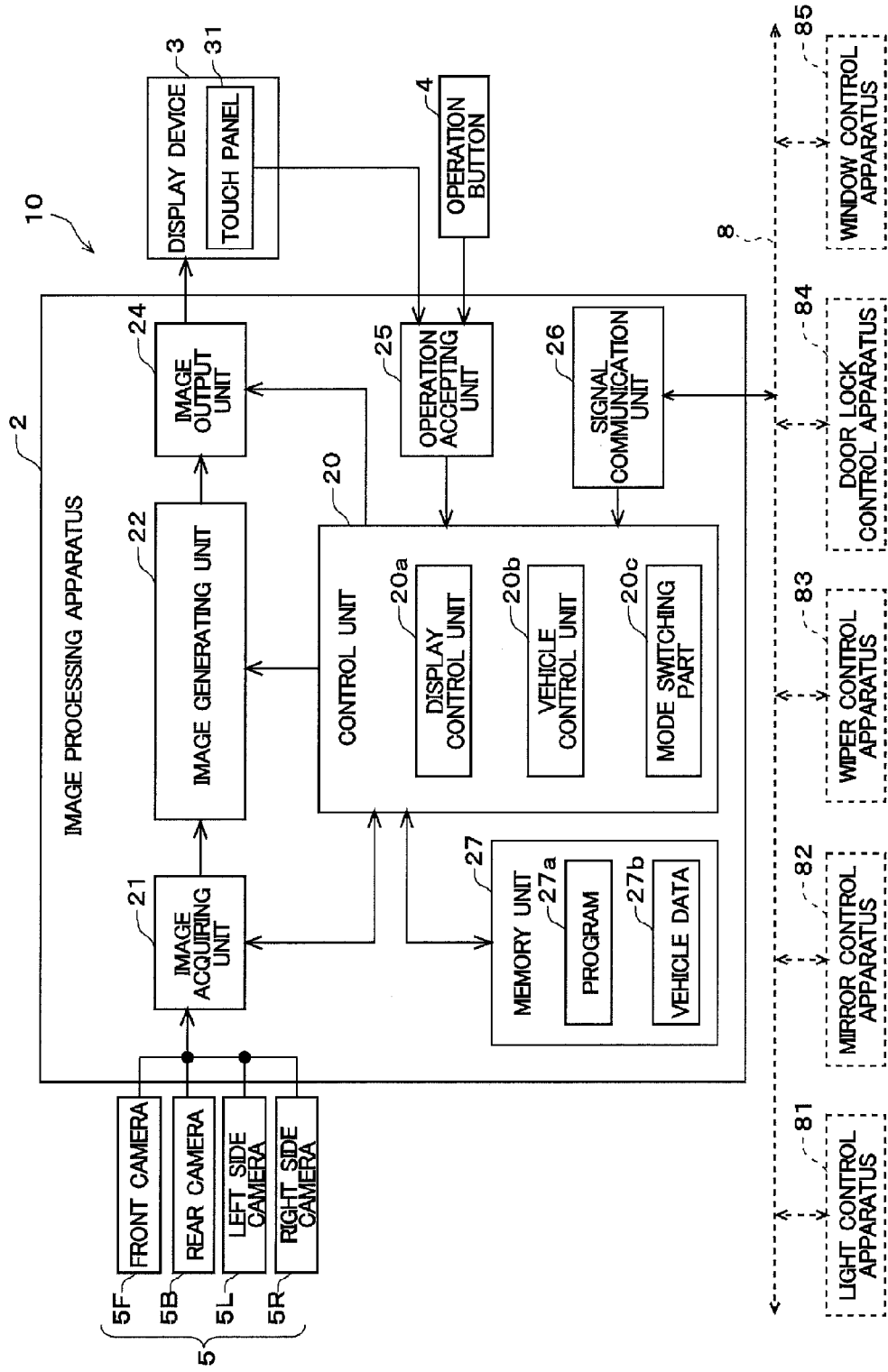
FIG. 16 is a drawing illustrating a configuration of a vehicle control apparatus of a third embodiment.

FIG. 16 is a drawing illustrating a configuration of a vehicle control apparatus 10 of the third embodiment. The vehicle control apparatus 10 of the third embodiment includes a mode switching part 20c in addition to the configuration of the first embodiment as illustrated in FIG. 1. The mode switching part 20c is part of functions of the control unit 20 achieved by a CPU by performing arithmetic processing in accordance with the program 27a. The mode switching part 20c switches an operation mode of the vehicle control apparatus 10 in accordance with the user's operation.

Figure 17:
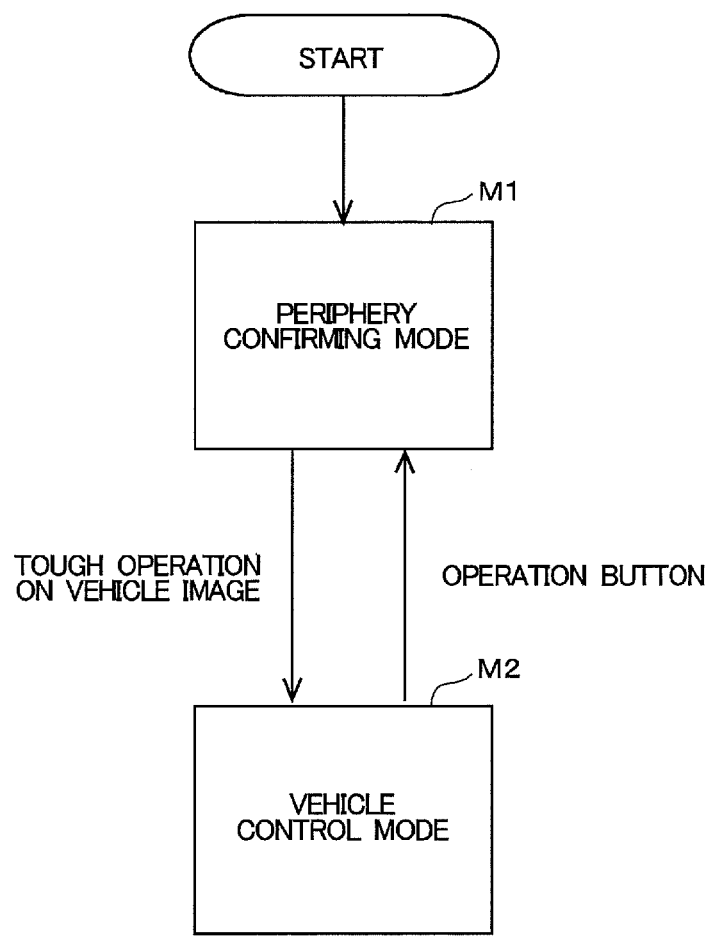
FIG. 17 is a drawing illustrating a transition of an operation mode in the vehicle control apparatus of the third embodiment.

FIG. 17 is a drawing illustrating a transition of an operation mode in the vehicle control apparatus 10. In this embodiment, if the function of the vehicle control apparatus 10 is activated, the mode switching part 20c firstly switches the operation mode to a periphery confirmation mode M1.

In the case of the periphery confirmation mode M1, the synthetic image CP showing the state of the periphery of the vehicle 9 and the shape of the vehicle 9 viewed from the virtual view point VP is displayed on the display device 3. In the case of the periphery confirmation mode M1 as well, the user is allowed to change the position of the virtual view point VP by the flick operation and change the enlargement factor by the pinch operation. Therefore, the user is capable of confirming the image of object and the vehicle image 90 having an arbitrary size viewed from a given view point.

In the case of the periphery confirmation mode M1 however, even when the enlargement factor exceeds a predetermined threshold value, the display control unit 20*a* does not display the frame 61 and the command button 62 on the display device 3. Therefore, the user is capable of confirming the state of the periphery of the vehicle 9 sufficiently without paying attention to the frames 61 and the command buttons 62.

In the case of the periphery confirmation mode M1, the user is capable of performing the touch operation aiming at the vehicle image 90 included in the synthetic image CP. In the case where the user performs the touch operation aiming at the vehicle image 90, the operation accepting unit 25 accepts the user's operation. The mode switching part 20*c* then switches the operation mode from the periphery confirmation mode M1 to a vehicle control mode M2.

In the case of the vehicle control mode M2, the vehicle control apparatus 10 executes the same process as the first embodiment. Therefore, in the case of the vehicle control mode M2, when the enlargement factor exceeds a predetermined threshold value, the display control unit 20*a* causes the display device 3 to display the frame 61 and the command button 62. Therefore, the user may issue an instruction for driving the portion of the vehicle 9 by performing the touch operation aiming at the command button 62.

Figure 18:
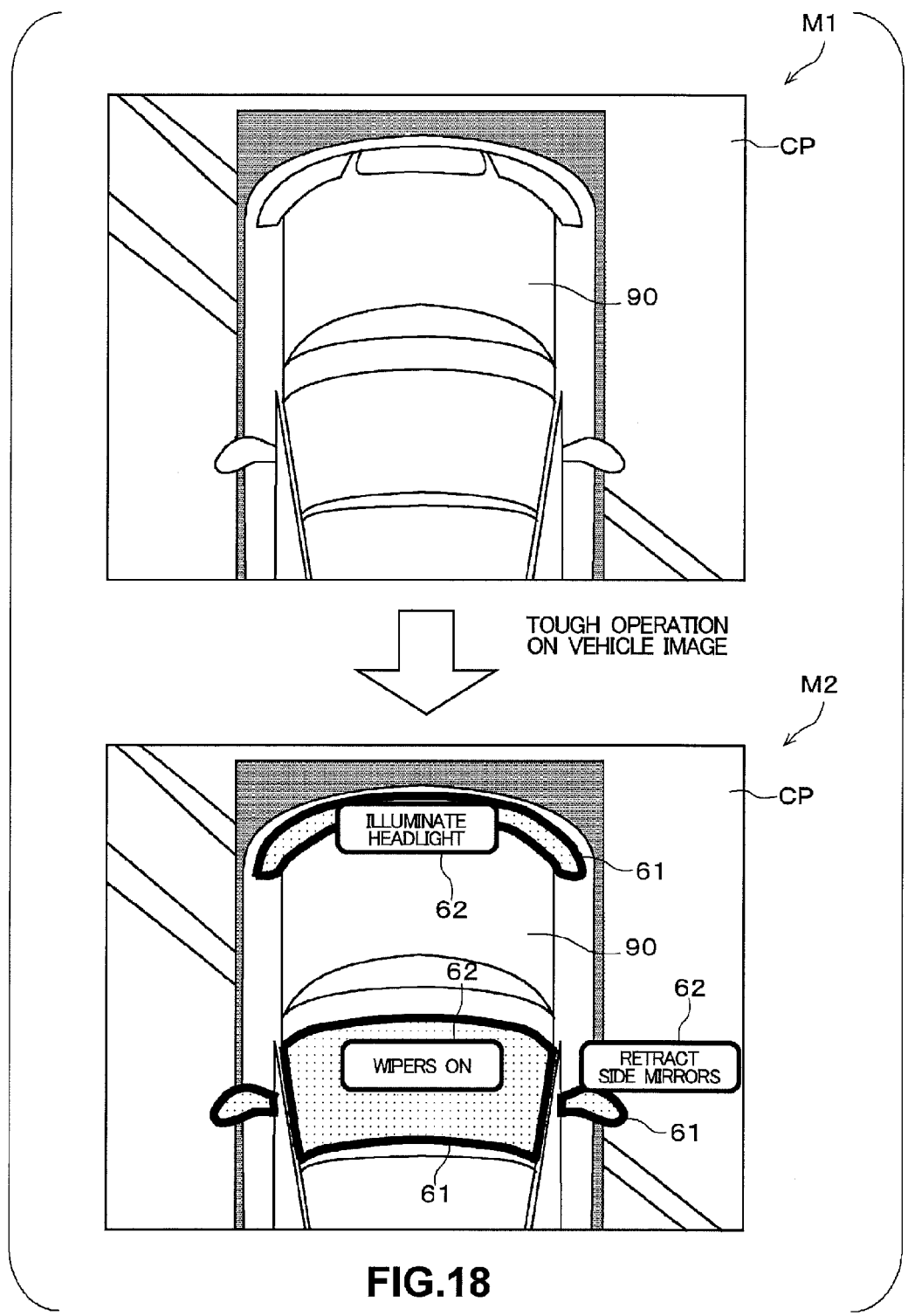
FIG. 18 is a drawing illustrating an example of the synthetic image in accordance with the operation mode.

For example, as illustrated in FIG. 18, a case where the synthetic image CP including the vehicle image 90 after the enlargement viewed from right above the vehicle 9 is displayed is assumed. As illustrated in the upper portion of FIG. 18, in the case of the periphery confirmation mode M1, the frames 61 and the command buttons 62 are not displayed. Therefore, the user is capable of confirming the state of the periphery of the vehicle 9 without being disturbed by the frames 61 and the command buttons 62. When the user performs the touch operation aiming at the vehicle image 90, the mode switching part 20*c* switches the operation mode from the periphery confirmation mode M1 to the vehicle control mode M2. Accordingly, as illustrated in the lower portion of FIG. 18, the frames 61 and the command buttons 62 are displayed in the display device 3.

Figure 19:
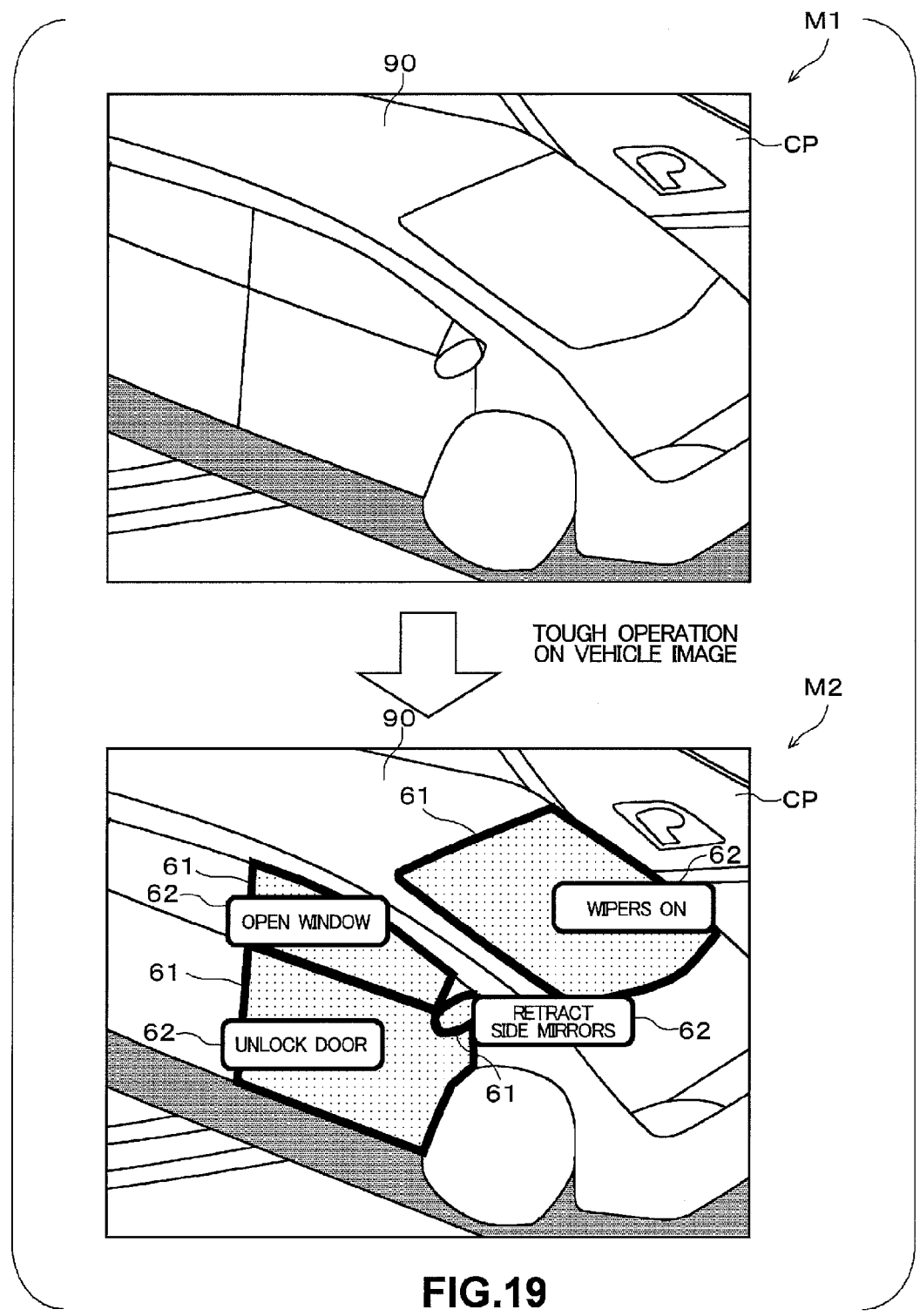
FIG. 19 is a drawing illustrating an example of the synthetic image in accordance with the operation mode.

Also, a case where the synthetic image CP including the vehicle image 90 after the enlargement viewed from the right of the vehicle 9 is displayed as illustrated in FIG. 19, for example, is assumed. As illustrated in the upper portion of FIG. 19, in the case of the periphery confirmation mode M1, the frames 61 and the command buttons 62 are not displayed. Therefore, the user is capable of confirming the state of the periphery of the vehicle 9 without being disturbed by the frames 61 and the command buttons 62. When the user performs the touch operation aiming at the vehicle image 90, the mode switching part 20*c* switches the operation mode from the periphery confirmation mode M1 to the vehicle control mode M2. Accordingly, as illustrated in the lower portion of FIG. 19, the frames 61 and the command buttons 62 are displayed on the display device 3.

In the case of the vehicle control mode M2, for example, when the user operates the operation button 4, the mode switching part 20*c* returns the operation mode from the vehicle control mode M2 to the periphery confirmation mode M1 (see FIG. 17).

In the third embodiment, in the case where the operation mode is the periphery confirmation mode M1, the display control unit 20*a* does not display the frame 61 and the command button 62 on the display device 3. Therefore, the user is capable of confirming the state of the periphery of the vehicle 9 sufficiently without paying attention to the frames 61 and the command buttons 62.

In the case where the operation accepting unit 25 accepts the user's operation aiming at the vehicle image 90, the mode switching part 20*c* switches the operation mode from the periphery confirmation mode M1 to the vehicle control mode M2. Therefore, the user is capable of performing the instruction of switching the operation mode from the periphery confirmation mode M1 to the vehicle control mode M2 easily. Therefore, the user is capable of issuing an instruction for driving the portion of the vehicle 9 smoothly after the state of the periphery of the vehicle 9 has been confirmed sufficiently.

<4. Modification>

Although the embodiments of this disclosure have been described thus far, this disclosure is not limited to the embodiments described above, and various modifications may be made. Such modifications will be described below. All of the modes including the above-described embodiment and modes described below may be combined as needed.

In the embodiments described above, the position of the virtual view point VP is set outside the vehicle 9. In contrast, in the case where the enlargement factor is significantly increased, the position of the virtual view point VP may be set in the interior of a cabin of the vehicle 9. In this case, the user is capable of issuing an instruction for controlling portions in the interior of the cabin of the vehicle 9.

Figure 20:
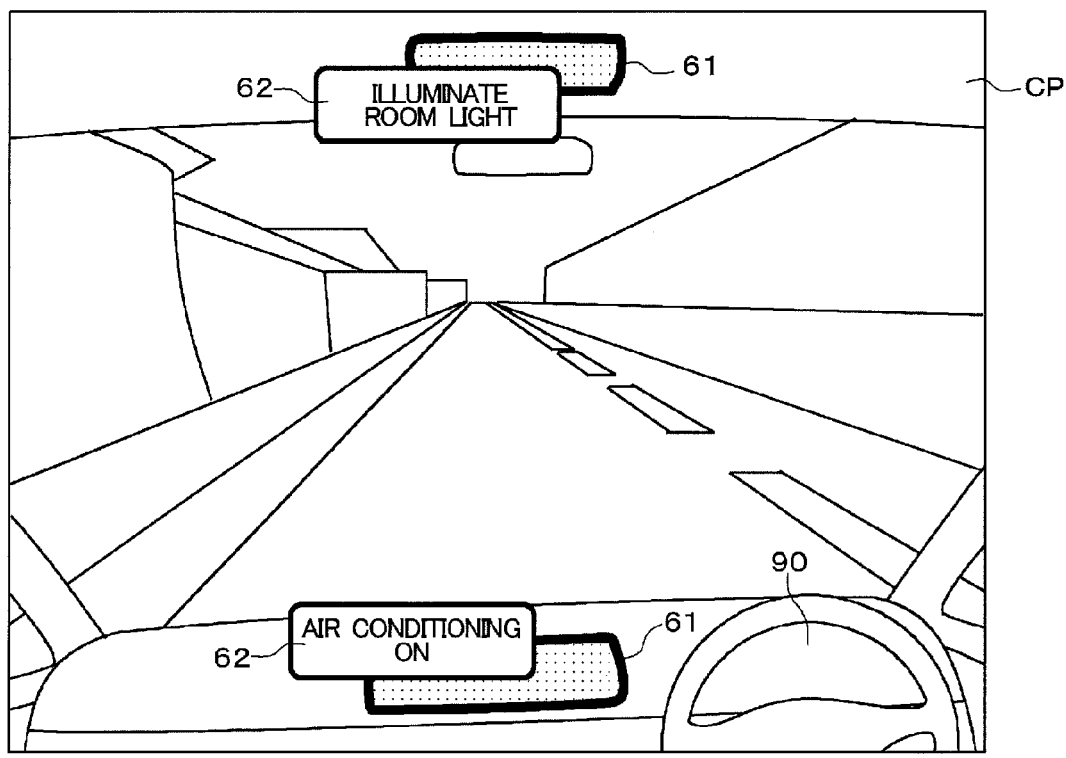
FIG. 20 is a drawing illustrating an example of the synthetic image viewed from a virtual view point in an interior of the vehicle.

FIG. 20 illustrates an example of the synthetic image CP in a case where the positions of the virtual view point VP are set in the interior of the vehicle 9. In this synthetic image CP, the vehicle image 90 showing the interior of the vehicle 9 is included. A room light and an air conditioning shown by the vehicle image 90 are surrounded by the frames 61 as portions to be controlled by the vehicle control apparatus 10. A command button 62 for issuing an instruction for illuminating the room light is displayed in the vicinity of the room light, and a command button 62 for issuing an instruction for turning the air conditioning ON is displayed in the vicinity of the air conditioning. The user may issue an instruction for driving the portion in the interior of the cabin of the vehicle 9 by performing the touch operation aiming at these command buttons 62.

In the embodiments described above, the command buttons 62 are employed as buttons for issuing instructions for driving the portions of the vehicle 9 by the user. However, icon buttons may also be employed. The portions of the vehicle 9 illustrated in the vehicle image 90 may function as buttons for issuing instructions for driving the portions in question.

In the embodiments described above, the vehicle control apparatus is a vehicle-mounted apparatus which is to be mounted on the vehicle 9. However, portable apparatus such as a smart phone or a tablet used by being brought into the vehicle 9 by the user may be acceptable. In the case where the portable apparatus is used as the vehicle control apparatus, an instruction signal configured to instruct driving of the portions of the vehicle 9 may be transmitted from the portable apparatus to the electronic apparatus mounted on the vehicle 9 with or without a wire.

In the embodiment described above, the user's operation for changing the position of the virtual view point VP is the flick operation, and the user's operation for changing the enlargement factor is the pinch operation. However, other operating methods may also be employed. In the embodiments described above, both of the user's operation for changing the position of the virtual view point VP and the user's operation for changing the enlargement factor are allowed. However, a configuration in which only one of these user's operations is allowed is also applicable.

In the second embodiment, the one portion whereof the command buttons 62 is to be displayed is selected by the user's operation. However, the one portion may be selected by the display control unit 20a on the basis of a predetermined standard. For example, a configuration in which the display control unit 20a selects one portion out of the portions to be controlled by the vehicle control apparatus 10 and shown by the vehicle image 90 and located at a position closest to the center of the synthetic image CP is also contemplated.

In the embodiments described above, the function described as one block is not necessarily required to be realized by a single physical element, but may be realized by dispersed physical elements. The functions described as a plurality of the blocks in the above-described embodiments may be achieved by a single physical element. The one function may be achieved as a whole by sharing the process relating to the one arbitrary function between the apparatus in the interior of the vehicle and the apparatus outside the vehicle, and exchanging information between these apparatuses by communication.

Although the entire or part of the function described to be realized by executing the program like software in the above-described embodiment may be realized by an electrical hardware circuit, and the entire or part of the function described to be realized by the hardware circuit may be realized like software. In the embodiments described above, the function described as one block may be realized by cooperation of the software and the hardware.

While the invention has been shown and described in detail, the foregoing description is in all aspects illustrative and not restrictive. It is therefore understood that numerous other modifications and variations can be devised without departing from the scope of the invention.

What is claimed is:

1. A vehicle control apparatus that controls a vehicle, the vehicle control apparatus comprising:
    a display device that displays a vehicle image showing a vehicle shape viewed from a virtual view point;
    an accepting part that accepts a user's operation;
    a display controller that causes the display device to display the vehicle image after a change and that causes the display device to display a button corresponding to a portion of the vehicle shown by the vehicle image after the change, when the accepting part accepts the user's operation that issues an instruction for changing the vehicle image;
    a vehicle controller that controls a portion of the vehicle corresponding to the button when the accepting part accepts the user's operation, the user's operation including operating the button; and
    a generator that generates a synthetic image showing a periphery of the vehicle viewed from the virtual view point by using a plurality of shot images obtained by shooting the periphery of the vehicle with at least one image capturing device, the periphery of the vehicle being included as a part of the synthetic image,
    wherein the display device displays the synthetic image including the vehicle image, and
    wherein the user is able to operate the button to control the portion of the vehicle while confirming a state of the periphery of the vehicle with the displayed synthetic image.

2. The vehicle control apparatus according to claim 1, wherein
    in a case where the accepting part accepts the user's operation that issues an instruction for enlarging the vehicle image, the display controller causes the display device to display the vehicle image after an enlargement, and also causes the display device to display a button corresponding to a portion of the vehicle shown by the vehicle image after the enlargement.

3. The vehicle control apparatus according to claim 1, wherein
    in a case where the accepting part accepts the user's operation that issues an instruction for changing the virtual view point, the display controller causes the display device to display the vehicle image viewed from the virtual view point after a change, and also causes the display device to display the button corresponding to a portion of the vehicle shown by the vehicle image viewed from the virtual view point after the change.

4. The vehicle control apparatus according to claim 1, wherein
    the display controller causes the display device to display the button corresponding to one portion in a case where the accepting part accepts a user's operation that issues an instruction for selecting the one portion of the vehicle shown by the vehicle image.

5. The vehicle control apparatus according to claim 1, further comprising:
    a mode switching part that switches an operation mode, wherein
    the display controller does not cause the display device to display the button in a case where the operation mode is a first mode, and causes the display device to display the button in a case where the operation mode is a second mode.

6. The vehicle control apparatus according to claim 5, wherein the mode switching part switches the operation mode from the first mode to the second mode in a case where the accepting part accepts the user's operation aiming at the vehicle image.

7. A vehicle control method that controls a vehicle, the vehicle control method comprising:
    (a) displaying a vehicle image showing a vehicle shape viewed from a virtual view point on a display device;
    (b) accepting a user's operation;
    (c) causing the display device to display a vehicle image after a change, and also causing the display device to display a button corresponding to a portion of the vehicle shown by the vehicle image after the change, when the step (b) accepts the user's operation that issues an instruction for changing the vehicle image;
    (d) controlling a portion of the vehicle corresponding to the button when the step (b) accepts the user's operation, the user's operation including operating the button; and
    (e) generating a synthetic image showing a periphery of the vehicle viewed from the virtual view point by using a plurality of shot images obtained by shooting the periphery of the vehicle with at least one image capturing device, the periphery of the vehicle being included as a part of the synthetic image,
    wherein the step (a) displays the synthetic image including the vehicle image, and
    wherein the user is able to operate the button to control the portion of the vehicle while confirming a state of the periphery of the vehicle with the displayed synthetic image.

8. The vehicle control method according to claim 7, wherein
in a case where the step (b) accepts the user's operation that issues an instruction for enlarging the vehicle image, the step (c) causes the display device to display the vehicle image after an enlargement, and also causes the display device to display a button corresponding to a portion of the vehicle shown by the vehicle image after the enlargement.

9. The vehicle control method according to claim 7, wherein
in a case where the step (b) accepts the user's operation that issues an instruction for changing the virtual view point, the step (c) causes the display device to display the vehicle image viewed from the virtual view point after a change, and also causes the display device to display the button corresponding to the portion of the vehicle shown by the vehicle image viewed from the virtual view point after the change.

10. The vehicle control method according to claim 7, wherein
the step (c) causes the display device to display the button corresponding to one portion in a case where the step (b) accepts a user's operation that issues an instruction for selecting the one portion of the vehicle shown by the vehicle image.

11. The vehicle control method according to claim 7, further comprising:
(f) switching an operation mode, wherein
the step (c) does not cause the display device to display the button in a case where the operation mode is a first mode, and causes the display device to display the button in a case where the operation mode is a second mode.

12. The vehicle control method according to claim 11, wherein
the step (f) switches the operation mode from the first mode to the second mode in a case where the step (b) accepts the user's operation aiming at the vehicle image.

* * * * *